(12) United States Patent  (10) Patent No.: US 8,922,060 B2
Koshin et al.  (45) Date of Patent: Dec. 30, 2014

(54) POWER SUPPLY APPARATUS

(75) Inventors: Hiroaki Koshin, Toyonaka (JP); Takuya Kagawa, Muko (JP)

(73) Assignee: Panasonic Corporation, Kadoma-shi (JP)

( * ) Notice: Subject to any disclaimer, the term of this patent is extended or adjusted under 35 U.S.C. 154(b) by 556 days.

(21) Appl. No.: 13/380,662

(22) PCT Filed: Jun. 23, 2010

(86) PCT No.: PCT/JP2010/060684
§ 371 (c)(1),
(2), (4) Date: Jan. 3, 2012

(87) PCT Pub. No.: WO2010/150829
PCT Pub. Date: Dec. 29, 2010

(65) Prior Publication Data
US 2012/0091814 A1  Apr. 19, 2012

(30) Foreign Application Priority Data
Jun. 25, 2009  (JP) .................. 2009-151632

(51) Int. Cl.
*H02J 1/00* (2006.01)
*H02J 1/10* (2006.01)
*H02J 3/38* (2006.01)
*H02J 7/34* (2006.01)

(52) U.S. Cl.
CPC ................. *H02J 1/102* (2013.01); *H02J 3/383* (2013.01); *H02J 3/387* (2013.01); *H02J 7/34* (2013.01); *Y02E 10/563* (2013.01)
USPC ......................................................... 307/66

(58) Field of Classification Search
CPC .................................................... H02J 2001/00
USPC ......................................................... 307/66
See application file for complete search history.

(56) References Cited

U.S. PATENT DOCUMENTS

| 6,583,602 B2 | 6/2003 | Imai et al. |
| 7,863,838 B2 | 1/2011 | Aso |
| 2002/0167291 A1 | 11/2002 | Imai et al. |
| 2010/0194318 A1 | 8/2010 | Aso |

FOREIGN PATENT DOCUMENTS

| JP | 10-248253 A | 9/1998 |
| JP | 2002-345161 A | 11/2002 |
| JP | 2006-288129 A | 10/2006 |

OTHER PUBLICATIONS

International Search Report dated Aug. 31, 2010, issued for PCT/JP2010/060684.

*Primary Examiner* — Daniel Cavallari
(74) *Attorney, Agent, or Firm* — Edwards Wildman Palmer LLP

(57) ABSTRACT

The power supply apparatus a main power device, an auxiliary power unit, and controlling means. Each of the main power device and the auxiliary power unit is configured to supply DC power to a DC supply line. The main power device is configured to generate DC power by use of power supplied from a secondary cell. The controlling means is configured to, when a measurement (a magnitude of a current flowing through the DC supply line) exceeds an optimal current magnitude, send an instruction to the main power device such that a current supplied from the main power device to the DC supply line has the same magnitude as the optimal current magnitude. The optimal current magnitude is defined as a magnitude of a current supplied to the DC supply line from the main power device operating so as to maximize a proportion of power supplied from the main power device to the DC supply line to the sum of power supplied from the secondary cell to the main power device and loss caused by an internal resistance of the secondary cell. The main power device is configured to adjust the magnitude of the current supplied to the DC supply line on the basis of the instruction received from the controlling means.

5 Claims, 11 Drawing Sheets

FIG. 11
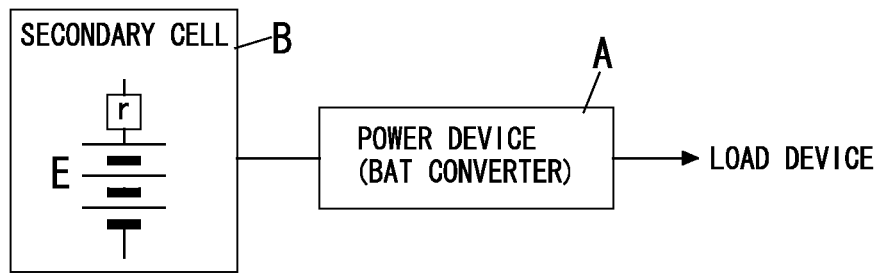
(a)
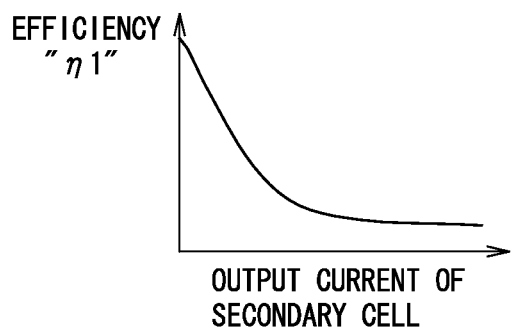
(b)
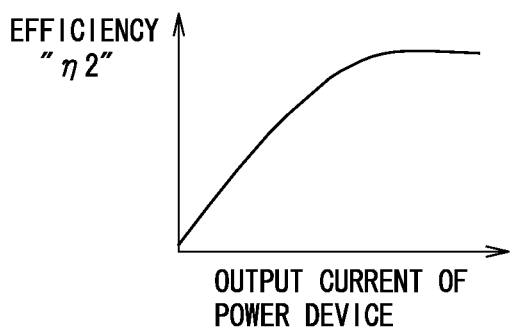
(c)
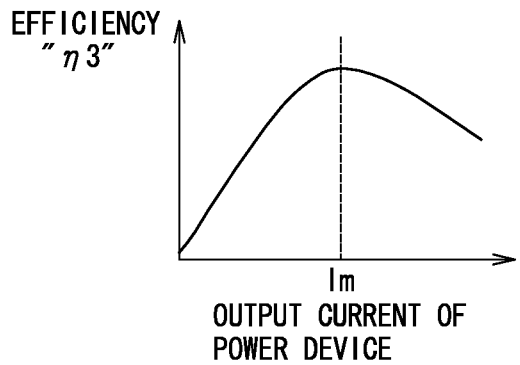
(d)

POWER SUPPLY APPARATUS

CROSS REFERENCE TO RELATED APPLICATIONS

This application is related to co-pending application: "POWER SUPPLY APPARATUS" filed even date herewith in the names of Hiroaki KOSHIN and Takuya KAGAWA as a national phase entry of PCT/JP2010/060683 filed on Jun. 23, 2010, which application is assigned to the assignee of the present application and is incorporated by reference herein.

TECHNICAL FIELD

The present invention relates to power supply apparatus configured to operate simultaneously multiple power devices to supply a DC power therefrom to a load device connected thereto.

BACKGROUND ART

In the past, there have been proposed various power supply apparatuses which simultaneously operate a plurality of power devices to supply DC power from the power devices to one or more load devices connected to the power devices.

For example, there is the power supply apparatus including all the power devices which make a constant voltage control. In this power supply apparatus, all the power devices are configured to output the same output voltage.

However, in a practical sense, it is difficult to adjust accurately the output voltages of all the power devices to be the same. Therefore, the power supply apparatus is likely to have a difference between the output voltages of the power devices. Consequently, in the aforementioned power supply apparatus, only the power device having the highest output voltage supplies a DC power to the load device in accordance with its available power capacity. In this situation, when the power device having the highest output voltage fails to supply enough power to the load device, the remaining power devices compensate for a shortage of power supply. Thus, in this power supply apparatus, the power device having the highest output voltage, that is, the particular power device is intensively used. Therefore, an advantage obtained from operating simultaneously the plurality of the power devices is reduced.

In order to solve the above problem, there has been proposed a power supply apparatus including two power devices which decrease monotonically its output voltage with an increase of its output current (see Japanese patent laid-open publication No. 10-248253). In this power supply apparatus, the two power devices shows individual output current-output voltage characteristics of which lines have different gradient from each other. This means that, when the two power devices varies their output current by the same extent, one of the power devices shows a variation of the output voltage different from that of the other power device.

In this power supply apparatus, each of the power devices operates to reach a balance point determined by its output current-output voltage characteristics and the load current in accordance with a magnitude of a consumed current (load current) of the load device. Therefore, each of the power devices can output the desired output voltage and output current. Besides, each power device decreases or increases an input voltage (source voltage) by use of a DC/DC converter incorporated therein, thereby generating an output voltage.

The power source connected to the aforementioned power device may be a secondary cell "B" as shown in (a) of FIG. 11.

The secondary cell "B" has an internal resistance "r" considered to be connected in series with an ideal voltage source "E" developing electromotive force. Therefore, power loss caused by the internal resistance "r" is increased with an increase of a current (output current) flowing through the internal resistance "r". Therefore, as shown in (b) of FIG. 11, the secondary cell "B" has a characteristic line indicating that an efficiency η1 (a proportion of output power of the secondary cell "B" to the sum of the output power of the secondary cell "B" and the power loss caused by the internal resistance "r") is decreased with an increase of the output current of the secondary battery "B".

The power device "A" connected to the secondary cell "B" has internal loss such as conduction loss (loss caused by an on-resistance of a switching element, a parasitic resistance of an inductor, or the like) in a DC/DC converter incorporated therein. Therefore, the power device "A" has a characteristic line with regard to an efficiency η2 as shown in (c) of FIG. 11. The efficiency η2 is defined as a proportion of output power of the power device to input power of the power device. The input power of the power device "A" is defined as the sum of the output power of the power device "A" and the internal loss of the power device "A".

As apparent from (b) and (c) in FIG. 11, with regard to a combination of the secondary cell "B" and the power device "A", an efficiency η3 (a proportion of the output power of the second power device 4c to the sum of the output power of the secondary cell 162 and the loss caused by the internal resistance "r") varies with the output current of the power device "A", as shown in (d) of FIG. 11. According to the characteristic line regarding the efficiency η3 shown in (d) of FIG. 11, the efficiency η3 becomes a maximum at a specific output current (output current of the power device "A"). Therefore, with adjusting the output current of the power device "A" connected to the secondary cell "B" to the output current corresponding to the maximal efficiency η3, it is possible to drive the power device "A" efficiently.

However, in the prior power supply apparatus, each power device varies its output current depending on a magnitude of the load current. Accordingly, as shown in (a) of FIG. 11, when the secondary cell "B" is connected to the power device "A" as a power source, the prior power supply apparatus is likely to operate the power device at an insufficient efficiency with regard to the combination of the secondary cell "B" and the power device "A".

DISCLOSURE OF INVENTION

In view of the above insufficiency, the present invention has been aimed to propose power supply apparatus capable of operating a power device at a maximal efficiency regarding a combination of the power device and a secondary cell used by the power device.

The power supply apparatus in accordance with the present invention includes a main power device, an auxiliary power unit, load current measuring means, judging means, and controlling means. Each of the main power device and the auxiliary power unit is adapted to be connected to a DC supply line to be connected to a load device and is configured to supply DC power to the load device through the DC supply line. The load current measuring means is configured to measure a current flowing through the DC supply line and output a measurement indicative of a magnitude of the measured current. The judging means is configured to, upon obtaining the measurement from the load current measuring means, judge whether or not the obtained measurement exceeds an optimal current magnitude. The main power device is configured to generate the DC power supplied to the load device by use of power supplied from a secondary cell connected thereto. The optimal current magnitude is defined as a magnitude of a current supplied to the DC supply line from the main power device which operates so as to maximize a proportion of power supplied from the main power device to the DC supply line to the sum of power supplied from the secondary cell to the main power device and loss caused by an internal resistance of the secondary cell. The controlling means is configured to, upon acknowledging that the judging means determines that the measurement exceeds the optimal current magnitude, send an instruction to the main power device such that a magnitude of the current supplied from the main power device to the DC power line is identical to the optimal current magnitude. The main power device includes adjusting means configured to adjust the current supplied from the main power device to the DC supply line on the basis of the instruction received from the controlling means.

In a preferred aspect, the auxiliary power unit includes a commercial power device. The commercial power device is configured to convert power obtained from a commercial power source connected thereto to the DC power so as to perform constant voltage control of supplying a constant voltage to the DC supply line irrespective of a current supplied therefrom to the DC supply line. The main power device is configured to perform inclination control of monotonically decreasing its output voltage supplied therefrom to the DC supply line with an increase of its output current supplied therefrom to the DC supply line, and of monotonically increasing the output voltage with a decrease of the output current. The controlling means is configured to, upon acknowledging that the judging means determines that the measurement exceeds the optimal current magnitude, send the instruction to the main power device such that the output current of the main power device has the same magnitude as the optimal current magnitude while the output voltage of the main power device is equal to a voltage supplied to the DC supply line from the commercial power device. The adjusting means is configured to, upon receiving the instruction from the controlling means, modify a condition of the inclination control so as to adjust the output current to a current corresponding to the instruction without varying the output voltage.

Additionally, in a more preferred aspect, the auxiliary power unit includes an inclination output power device. The inclination output power device is configured to perform second inclination control of monotonically decreasing its second output voltage supplied therefrom to the DC supply line with an increase of its second output current supplied therefrom to the DC supply line, and of monotonically increasing the second output voltage with a decrease of the second output current. The controlling means is configured to, upon acknowledging that the judging means determines that the measurement exceeds the optimal current magnitude, send a second instruction to the inclination output power device such that the second output current of the inclination output power device has the same magnitude as a difference between the measurement and the optimal current magnitude. The inclination output power device includes second adjusting means configured to adjust the second output current on the basis of the second instruction. The second adjusting means is configured to, upon receiving the second instruction from the controlling means, modify a condition of the second inclination control so as to adjust the second output current to a current corresponding to the second instruction without varying the second output voltage.

Additionally, in a further preferred aspect, the commercial power device is configured to, when the inclination output power device fails to supply the second output current having the magnitude corresponding to the second instruction, supply to the DC supply line the current having the same magnitude as a difference between the measurement and the sum of the output current of the main power device and the second output current of the inclination output power device.

In a preferred aspect, the auxiliary power unit is configured to supply to the DC supply line a current having the same magnitude as a difference between the magnitude of the current supplied from the main power device to the DC supply line and the optimal current magnitude while the adjusting means of the main power device supplies to the DC supply line the current corresponding to the instruction received from the controlling means.

BRIEF DESCRIPTION OF DRAWINGS

FIG. 11 shows a block diagram (a) illustrating a connection of the secondary cell and the power device, a diagram (b) illustrating a variation of an efficiency of the secondary cell with regard to an output current of the secondary cell, a diagram (c) illustrating a variation of an efficiency of the power device with regard to an output current of the power device, and a diagram (d) illustrating a variation of efficiency of a combination of the secondary cell and the power device with regard to an output current of the power device.

BEST MODE FOR CARRYING OUT THE INVENTION

First Embodiment

Figure 2:
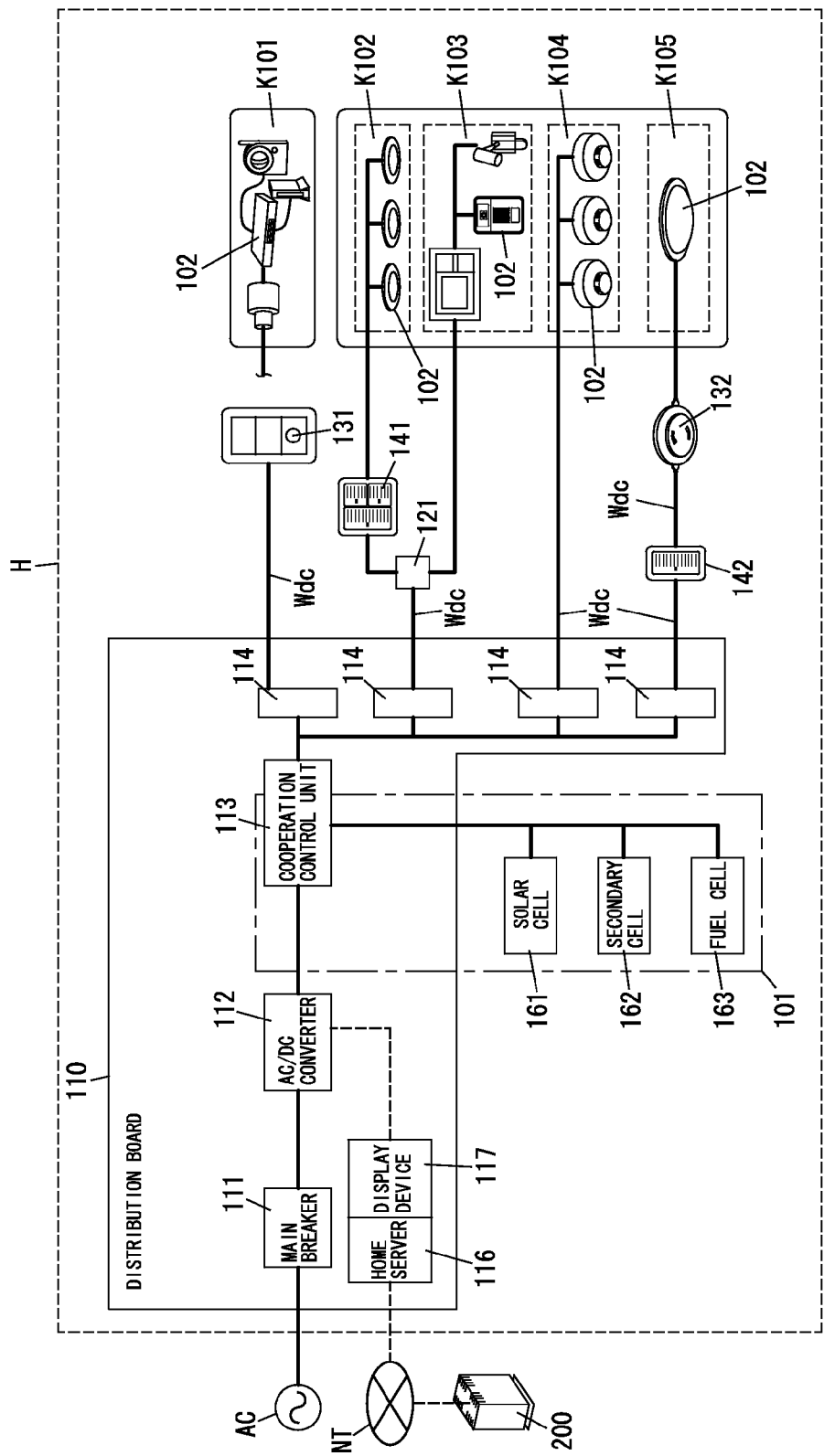
FIG. 2 is a configuration diagram illustrating the above power supply apparatus.

In the embodiment explained below, a house of a single-family dwelling is exemplified as a building where power supply apparatus 3 of the present invention is installed. The power supply apparatus 3 in accordance with the present invention may be installed in a housing complex. As shown in FIG. 2, there are a DC power supply unit 101 configured to supply DC power and DC devices (load devices) 102 placed in a house "H". Each DC device 102 is a load activated by DC power. The DC power supply unit 101 has an output terminal connected to the DC devices 102 via a DC supply line Wdc and supplies DC power from the output terminal to the DC devices via the DC supply line Wdc. There is a DC breaker 114 interposed between the DC power supply unit 101 and the DC device 102. The DC breaker 114 is configured to monitor a current flowing through the DC supply line Wdc. Upon detecting an abnormal state, the DC breaker 114 limits or terminates electrical power supply from the DC power supply unit 101 to the DC device 102 via the DC supply line Wdc.

The DC supply line Wdc is adopted as a power line for DC power as well as a communication line. For example, it is possible to communicate between devices connected to the DC supply line Wdc by means of superimposing on a DC voltage a communication signal used for transmitting data and made of a high-frequency carrier. This technique is similar to a power line communication technique where a communication signal is superimposed on an AC voltage applied to a power line for supplying an AC power.

The aforementioned DC supply line Wdc is connected to a home server 116 via the DC power supply unit 101. The home server 116 is a primary device for constructing a home communication network (hereinafter referred to as "home network"). The home server 116 is configured to communicate with a subsystem constructed by the DC devices 102 in the home network, for example.

In the illustrated instance, an information system K101, lighting systems K102 and K105, an entrance system K103, and a home alarm system K104 are adopted as the subsystem. The information system K101 includes the informational DC device 102 such as a personal computer, a wireless access point, a router, and an IP telephone transceiver. Each of the lighting systems K102 and K105 includes the lighting DC device 102 such as a lighting fixture. The entrance system K103 includes the DC device 102 configured to respond to a visitor and to monitor an intruder. The home alarm system K104 includes the alarming DC device 102 such as a fire alarm. The each subsystem is an autonomous distributed system, and operates by itself.

The aforementioned DC breaker 114 is associated with the subsystem. In the illustrated instance, the information system K101, a set of the lighting system K102 and the entrance system K103, the home alarm system K104, and the lighting system K105 are associated with the four single DC breakers 114, respectively. A connection box 121 is provided to associate the single DC breaker 114 with a plurality of the subsystems. The connection box 121 is configured to divide a system of the DC supply line for each subsystem. In the illustrated instance, the connection box 121 is interposed between the lighting system K102 and the entrance system K103.

The information system K101 includes the DC device 102 connected to a DC socket 131 preliminarily provided to the house "H" (provided at the time of constructing the house "H") as a wall outlet or a floor outlet, for example.

The lighting system K102 includes the lighting fixture (DC device 102) preliminarily provided to the house "H". Meanwhile, the lighting system K105 includes the lighting fixture (DC device 102) connected to a ceiling-mounted hooking receptacle 132 preliminarily provided on a ceiling. It is noted that the lighting fixture is attached to the ceiling-mounted hooking receptacle 132 by a contractor at the time of constructing an interior of the house "H" or attached to the ceiling-mounted hooking receptacle 132 by a resident of the house "H".

The lighting fixture of the lighting system K102 can receive a control instruction from an infrared remote controller. Further, the control instruction can be sent by use of a communication signal transmitting to the lighting fixture from a switch 141 connected to the DC supply line Wdc. The lighting fixture of the lighting system K105 can receive a control instruction from an infrared remote controller. Further, the control instruction can be sent by use of a communication signal transmitting to the lighting fixture from a switch 142 connected to the DC supply line Wdc. In short, each of the switches 141 and 142 has a function of communicating with the DC device 102. The control instruction may be given by the manipulation of each of the switches 141 and 142. In addition, the control instruction can be sent by use of a communication signal transmitted to the DC device 102 from the home server 116 or the other DC device 102 of the home network. The control instruction for the lighting fixture indicates such as turning on, turning off, dimming, and blinking.

Any DC device 102 can be connected to the DC outlet 131 or the ceiling-mounted hooking outlet 132. Each of the DC outlet 131 and the ceiling-mounted hooking receptacle 132 supplies DC power to the connected DC device 102. Therefore, the DC outlet 131 and the ceiling-mounted hooking receptacle 132 are hereinafter collectively referred to as "DC outlet", if a distinction between the DC outlet 131 and the ceiling-mounted hooking receptacle 132 is unnecessary.

The DC outlet has a case which is provided with a connection slot (plug-in connection slot) for inserting a terminal of the DC device 102. The case houses a terminal receiving member configured to directly contact to the terminal which is inserted into the case via the connection slot. In brief, the DC outlet with above mentioned configuration makes contact-type power supply. The DC device 102 with a communication function is capable of transmitting a communication signal via the DC supply line Wdc. The communication function is provided to the DC outlet in addition to the DC device 102.

The home server 116 is connected to the home network as well as the wide area network NT constructing the Internet. While the home server 116 is connected to the wide area network NT, a user can enjoy service provided by a center server (computer server) 200 connected to the wide area network NT.

The center server 200 provides a service of monitoring or controlling a device (which is mainly the DC device 102, but which may be other apparatus having a communication function) connected to the home network via the wide area network NT, for example. The service enables monitoring or controlling a device connected to the home network by use of a communication terminal (not shown) having a browsing function such as a personal computer, an internet TV, and a mobile telephone equipment.

The home server 116 has a function of communicating with the center server 200 connected to the wide area network NT and a function of communicating with a device connected to the home network. The home server 116 further has a function of collecting identification information (e.g. IP address) concerning a device connected to the home network.

The home server 116 utilizes the function of communicating with the center server 200, thereby enabling the communication terminal connected to the wide area network NT to monitor and control the home device via the center server 200. The center server 200 mediates a communication between the home device and the communication terminal on the wide area network NT.

When a user attempts to monitor or control the home device by use of the communication terminal, the user controls the communication terminal so as to store a monitoring request or a control request in the center server 200. The device placed in the house establishes periodically one-way polling communication, thereby receiving the monitoring request or control request from the communication terminal. According to the aforementioned operation, it is possible to monitor or control the device placed in the house by use of the communication terminal.

When an event (such as fire detection) of which the home device should notify the communication terminal occurs, the home device notifies the center server 200 of occurrence of the event. When the center server 200 is notified of the occurrence of the event by the home device, the center server 200 notifies the communication terminal of the occurrence of the event by use of an e-mail.

A function of communicating with the home network of the home server 116 includes an important function of detecting and managing a device constructing the home network. By means of utilizing UPnP (Universal Plug and Play), the home server 116 automatically detects a device connected to the home network. The home server 116 further includes a display device 117 having a browsing function, and controls the display device 117 to display a list of the detected device. The display device 117 includes a touch panel or another user interface unit. Therefore, it is possible to select a desired one from options displayed on a screen of the display device 117. Accordingly, a user (a contractor or a resident) of the home server 116 can monitor and control the device through the screen of the display device 117. The display device 117 may be separated from the home server 116.

The home server 116 manages information with relation to connection of devices. For example, the home server 116 stores a type or a function and an address of the device connected to the home network. Therefore, it is possible to make a linked operation between devices of the home network. As described in the above, the information with relation to connection of a device is automatically detected. In order to make the linked operation between the devices, it is sufficient that an association between devices is automatically made by an attribution of a device. An information terminal such as a personal computer may be connected to the home server 116. In this instance, the association between devices can be made by use of a browsing function of the information terminal.

Each of the devices holds a relation with regard to the linked operations between the devices. Therefore, the devices can make the linked operation without requiring to access to the home server 116. After establishing an association with regard to the linked operation of respective devices, a lighting fixture, which is one of the devices, is caused to turn on and off by manipulation of a switch, which is another of the devices, for example. Although the association with regard to the linked operation is made for the devices belonging to the same subsystem, the association with regard to the linked operation may be made for the devices belonging to the different subsystems.

Basically, the DC supply unit 101 is configured to generate DC power from AC power supplied from a commercial power source AC located outside. In the illustrated configuration, the commercial power source AC is connected to an AC/DC converter 112 including a switching regulator via a main breaker 111. The main breaker 111 is embedded in a distribution board 110. DC power outputted from the AC/DC converter 112 is supplied to each DC breaker 114 via a cooperation control unit 113.

The DC supply unit 101 is provided with a secondary cell 162 in view of a period (an outage of the commercial power source AC) in which the DC supply unit 101 fails to receive electrical power from the commercial power source AC. For example, the secondary cell 162 may be a lithium ion secondary battery. In the DC supply unit 101, a solar cell 161 and a fuel cell 163 configured to generate DC power can be used together with the secondary cell 162. Each of the solar cell 161, the secondary cell 162, and the fuel cell 163 acts as a dispersed power source in view of a main power source including the AC/DC converter 112 configured to create DC power from AC power supplied from the commercial power source AC. Besides, the secondary cell 162 includes a charge controlling circuit (not shown).

The secondary cell 162 is charged by at least one of the commercial power source AC, the solar cell 161, and the fuel cell 163 at a proper timing. The secondary cell 162 is discharged during a period in which the DC supply unit 101 fails to receive electrical power from the commercial power source AC. In addition, the secondary cell 162 is discharged at appropriate timing as necessary. The cooperation control unit 113 is configured to control discharge and charge of the secondary cell 162 and to make cooperation between the main power source and the dispersed power sources. In brief, the cooperation control unit 113 functions as a DC power control unit configured to control distributing to the DC device 102 electrical power from the main power source and dispersed power source constituting the DC supply unit 101.

A drive voltage of the DC device 102 is selected from different voltages respectively suitable to individual devices of different voltage requirements. For this purpose, the cooperation control unit 113 is preferred to include a DC/DC converter configured to convert DC voltage from the main power source and dispersed power sources into a desired voltage. Normally, a fixed voltage is applied to one subsystem (or the DC device 102 connected to one particular DC breaker 114). However, different voltages may be selectively applied to one subsystem by use of three or more lines. Use of two wired DC supply line Wdc can vary the voltage applied between wires with time. The DC/DC converter can be placed at plural points in a similar fashion as the DC breakers.

In the aforementioned configuration instance, only one AC/DC converter 112 is provided. However, a plurality of the AC/DC converters 112 may be connected in parallel to each other. When the plurality of the AC/DC converters 112 is provided, it is preferred to vary the number of the AC/DC converters 112 being activated in accordance with an amount of power required by loads.

Each of the AC/DC converter 112, the cooperation control unit 113, the DC breaker 114, the solar cell 161, the secondary cell 162, and the fuel cell 163 is provided with a communication function. Therefore, the linked operation can be performed in response to status of each of the main power source, dispersed power sources, and loads including the DC device 102. Like a communication signal used for the DC device 102, a communication signal used by the communication function is transmitted by being superimposed on DC voltage.

In the aforementioned instance, in order to convert AC power outputted from the main breaker 111 to DC power, the AC/DC converter 112 is placed in the distribution panel 110. However, the AC/DC converter 112 is not necessarily placed in the distribution panel 110. For example, branch breakers (not shown) may be connected to an output side of the main breaker 111 in the distribution panel 110 such that a plurality of systems is branched off from an AC supply line, and an AC/DC converter may be provided to an AC supply line of each of the systems. That is, each system may be provided with an apparatus configured to convert AC power into DC power.

In this arrangement, it is possible to provide the DC supply unit 101 to each unit such as a floor or room of the house "H". Accordingly, it is possible to manage the DC supply unit 101 for each system. In addition, it is possible to shorten a distance between the DC supply unit 101 and the DC device 102 configured to utilize DC power. Therefore, it is possible to reduce power loss caused by a voltage drop which occurs in the DC supply line Wdc. Alternatively, the main breaker 111 and branch breaker may be housed in the distribution panel 110, and the AC/DC converter 112, the cooperative control unit 113, the DC breaker 114, and the home server 116 may be placed in another panel different from the distribution panel 110.

Figure 1:
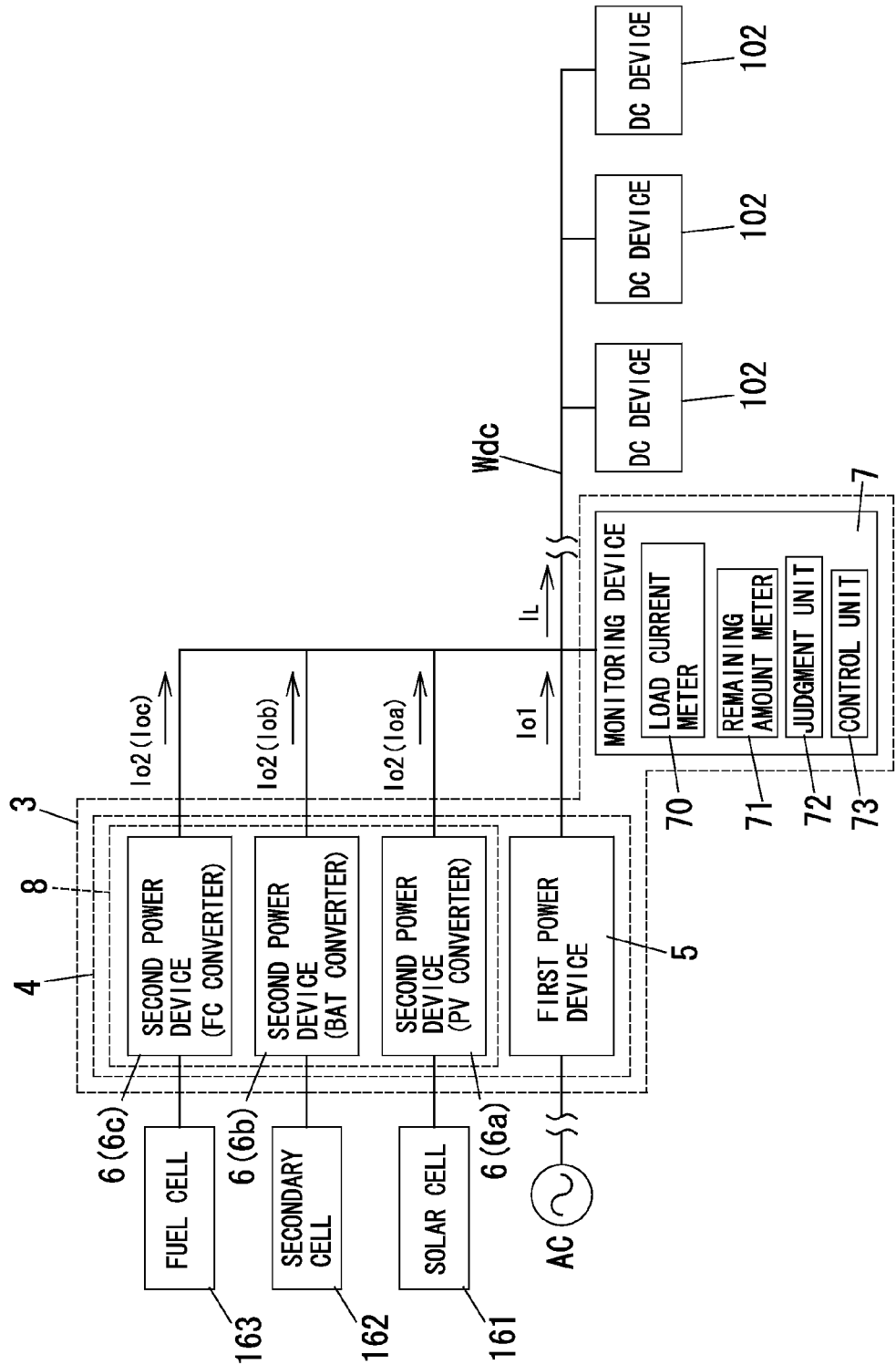
FIG. 1 is a block diagram illustrating a primary part of power supply apparatus of the first embodiment.

Next, an explanation referring to FIG. 1 is made to the power supply apparatus 3 housed in the DC power supply unit 101. The power supply apparatus 3 includes a plural (in the illustrated instance, four) power devices 4, 4, . . . , and a monitoring device 7. The power devices 4, 4, . . . are configured to operate simultaneously to supply a DC power to the DC device (load device) 102. The monitoring device 7 is configured to monitor a whole system regarding the DC power supply.

The plural power devices 4, 4, . . . include a single first power device 4a and plural (in the illustrated instance, three) second power devices 4b to 4d.

In the present embodiment, the second power device 4c is used as a main power device. The remaining power devices 4a, 4b, and 4d constitute an auxiliary power unit.

Figure 5:
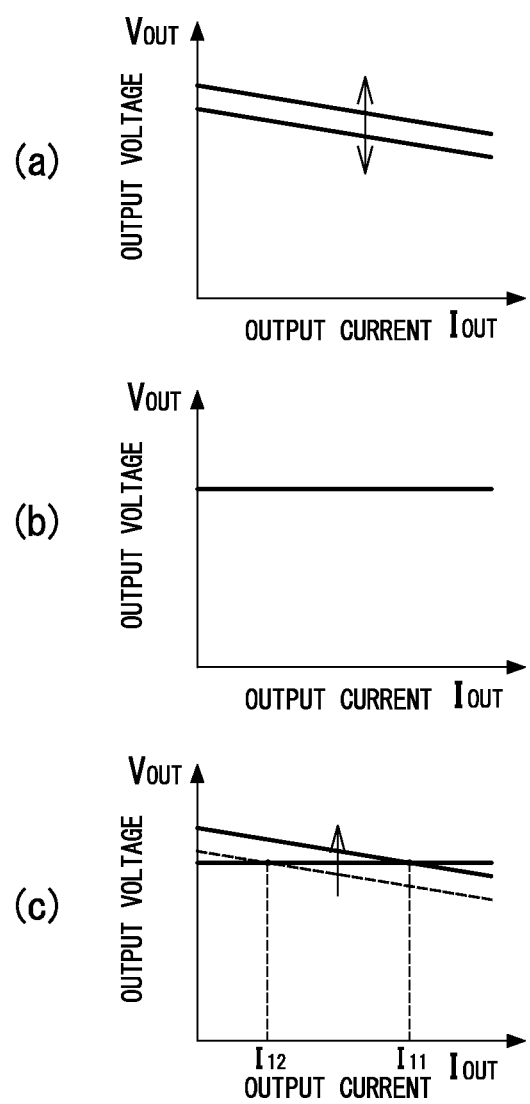
FIG. 5 shows a diagram (a) illustrating output current-output voltage characteristics of the second power device of the above power supply apparatus, a diagram (b) illustrating output current-output voltage characteristics of the first power device of the above power supply apparatus, and an explanatory view (c) illustrating an output current of the second power device of the above power supply apparatus.

The first power device 4a is configured to provide the output voltage Vout of a DC voltage which is a constant voltage irrespective of a magnitude of the output current Iout (see (b) in FIG. 5). The first power device 4a receives a voltage supplied from the commercial power source AC as the input voltage Vin. That is, the first power source 4a is defined as a commercial power source dedicated power device (commercial power device) configured to receive the voltage supplied from the commercial power source AC and supply DC power to the DC device 102.

In brief, the first power device 4a is adapted to be connected to the commercial power source AC. The first power device 4a is configured to convert power obtained from the commercial power source AC to DC power so as to perform constant voltage control of supplying a constant voltage (output voltage Voa) to the DC supply line Wdc irrespective of a current (output current Ioa) supplied therefrom to the DC supply line Wdc.

In the present embodiment, as shown in FIG. 2, the first power device 4a is connected to the commercial power source AC via the AC/DC converter 112. That is, the AC/DC converter 112 converts the AC voltage from the commercial power source AC to a predetermined DC voltage, and provides the resultant DC voltage to the first power device 4a. Thus, the input voltage Vin is the DC voltage outputted from the AC/DC converter 112. Alternatively, the input voltage Vin may be an AC voltage supplied from the commercial power source AC. In this arrangement, the first power device 4a is provided with an AC/DC converter configured to convert the input voltage Vin of the AC voltage to a DC voltage and supply the resultant DC voltage to the DC/DC converter 52.

Figure 3:
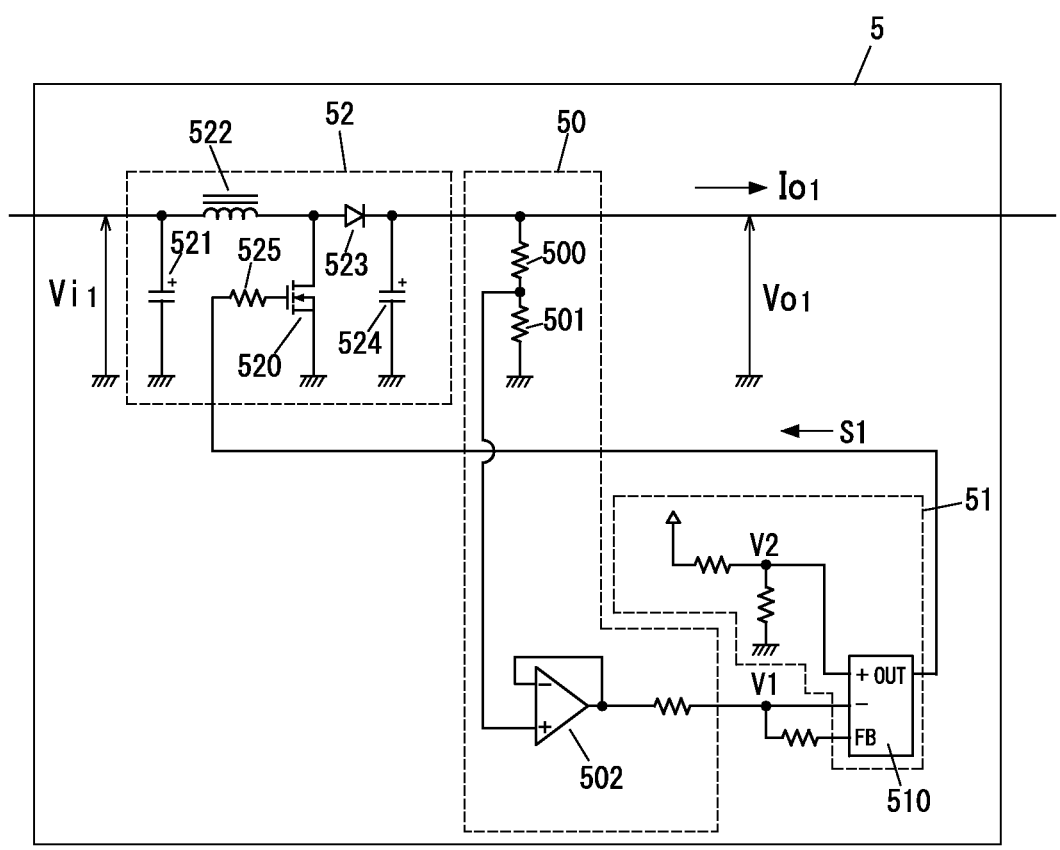
FIG. 3 is a circuit diagram illustrating a first power device of the above power supply apparatus.

As shown in FIG. 3, the first power device 4a includes a voltage meter 50, a switching controller 51, and the DC/DC converter 52. The voltage meter 50 is configured to measure the output voltage Vout (Voa). The switching controller 51 is configured to generate a pulse width modulation signal S1 which has its duty ratio selected based on a reference voltage V2 and a detection voltage V1 of the voltage meter 50. The DC/DC converter 52 includes a switching device 520. The switching device 520 is configured to be turned on and off in accordance with the duty ratio of the pulse width modulation signal S1 outputted from the switching controller 51.

The voltage meter 50 includes two resistors 500 and 501 connected in series and a voltage follower 502 configured to receive a divided voltage generated by the resistors 500 and 501, thereby measuring the output voltage Vout (Voa) of the first power device 4a. The voltage meter 50 is configured to measure the output voltage Voa and provide the detection voltage V1 corresponding to the measured output voltage Voa to the switching controller 51.

The switching controller 51 includes a switching IC 510 configured to receive the detection voltage (an output voltage of the voltage follower 502) V1 of the voltage meter 50 as well as the reference voltage V2.

The switching IC 510 is configured to output to the switching device 520 the pulse width modulation signal S1 which has its duty ratio selected such that a difference voltage (=V2−V1) between the detection voltage V1 and the reference voltage V2 is kept constant. That is, the switching IC 510 is configured to select the duty ratio of the pulse width modulation signal S1 such that the output voltage Vout (the detection voltage V1) is kept constant.

The DC-DC converter 52 includes a smoothing capacitor 521, an inductor 522, the switching device 520, a diode 523, and a smoothing capacitor 524 which are arranged in this order from its input side. The DC-DC converter 52 operates to turn on and off the switching device 520 for increasing the input voltage Vin.

For example, the switching device 520 is a field-effect transistor. The switching device 520 has its gate receiving the pulse width modulation signal S1 from the switching IC 510 via a resistor 525. Therefore, the switching device 520 is turned on and off in accordance with the duty ratio of the pulse width modulation signal S1 from the switching controller 51. While the switching device 520 is turned on, the switching device 520 has its source electrically connected to its drain. Thereby, the inductor 522 continues to accumulate electromagnetic energy. Thereafter, when the switching device 520 is turned off, the inductor 522 discharges the accumulated electromagnetic energy. Thereby, the input voltage Vin is increased. The increased input voltage Vin is smoothed by the smoothing capacitor 524 and is supplied to the DC device 102 (see FIG. 1) as the output voltage Vout.

According to the aforementioned operation, the first power device 4a can make a feedback control to have the output current-output voltage characteristics of keeping the output voltage Vout constant irrespective of the magnitude of the output current Iout, as shown in (b) of FIG. 5.

Each of the second power devices 4b to 4d is configured to provide its output voltage Vout (a voltage supplied to the DC supply line Wdc) decreasing monotonically as its output current Iout (a current supplied to the DC supply line Wdc) increases, as shown in (a) of FIG. 5. A line indicative of output current-output voltage characteristics of each of the second power devices 4b to 4d can be expressed as a relation of Vout=−α*Iout+V0 (α>0, V0>0). In this relation, V0 is constant, and satisfies a relation V0=Vout+α*Iout. It is noted that "α" may be different in each of the second power devices 4b to 4d and may be common to the second power devices 4b to 4d.

In other words, each of the second power devices 4b to 4d is configured to perform inclination control of monotonically decreasing its output voltage Vout supplied to the DC supply line Wdc with an increase of its output current Iout supplied therefrom to the DC supply line Wdc, and of monotonically increasing its output voltage Vout with a decrease of its output current Iout.

As shown in FIG. 1, the second power devices 4b, 4c, and 4d are connected to the solar cell 161, the secondary cell 162, and the fuel cell 163, respectively. The second devices 4b to 4d receive output voltages from the corresponding cells 161 to 163 as their input voltages Vin, respectively. In other words, the second power device 4b is defined as a solar cell dedicated power device configured to supply DC power to the DC device 102 by making use of the supplied voltage from the solar cell 161. The second power device "6b" is defined as a secondary cell dedicated power device configured to supply DC power to the DC device 102 by making use of the supplied voltage from the secondary cell 162. The second power device "6c" is defined as a fuel cell dedicated power device configured to supply DC power to the DC device 102 by making use of the supplied voltage from the fuel cell 163. In the preset embodiment, the second power device 4b defines an inclination output power device.

Figure 4:
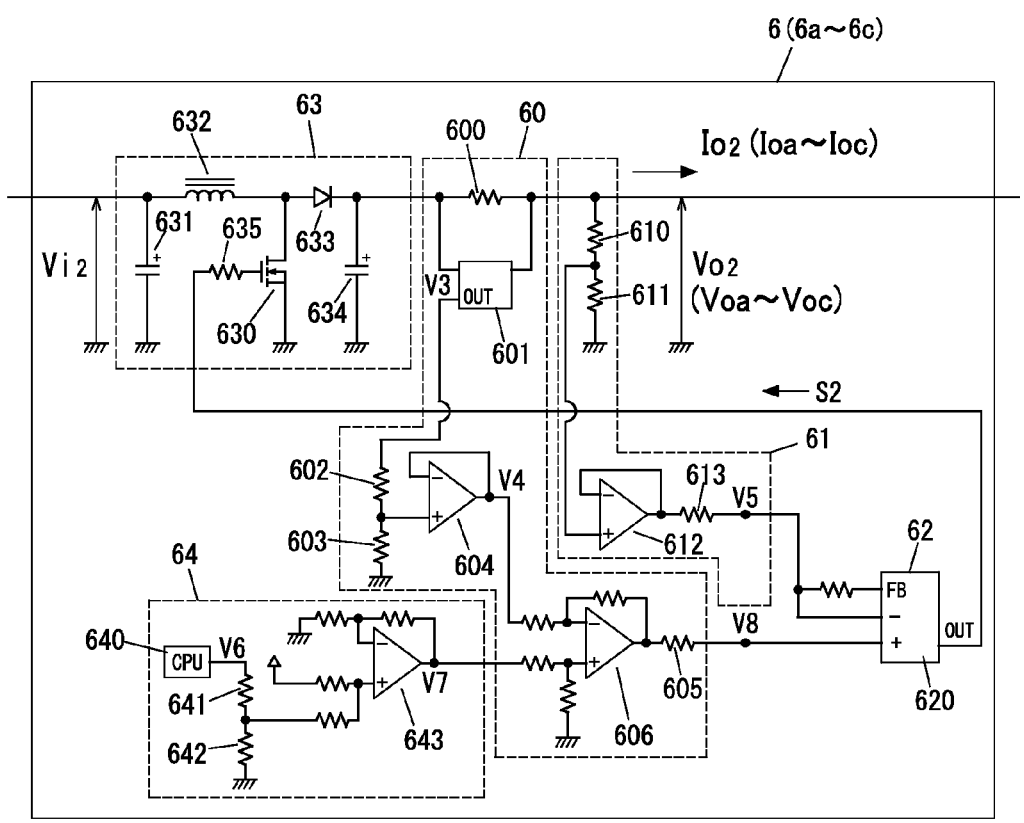
FIG. 4 is a circuit diagram illustrating a second power device of the above power supply apparatus.

As shown in FIG. 4, each of the second power devices 4b to 4d includes a current meter 60, a voltage meter 61, a switching controller 62, a DC-DC converter 63, and adjustment means 64. The current meter 60 is configured to measure the output current Iout (Iob, Ioc, Iod). The voltage meter 61 is configured to measure the output voltage Vout (Vob, Voc, Vod). The switching controller 62 is configured to generate a pulse width modulation signal S2 which has its duty ratio selected on the basis of a detection voltage V5 of the voltage meter 61 and a voltage V8 outputted from the current meter 60. The DC/DC converter 63 includes a switching device 630. The switching device 630 is configured to be turned on and off in accordance with the duty ratio of the pulse width modulation signal S2 outputted from the switching controller 62. The adjusting means 64 is configured to adjust the output current Iout (Iob, Ioc, Iod) in accordance with an instruction from a control unit 73 (see FIG. 1) as explained below.

The current meter 60 includes resistors 600 and 605, a current IC 601 configured to measure a voltage across the resistor 600, resistors 602 and 603 for dividing an output voltage V3 of the current IC 601, and a voltage follower 604 configured to receive a divided voltage generated by the resistors 602 and 603. Thus, the current meter 60 is configured to measure the output current Iout (Iob, Ioc, Iod) of the corresponding second power device (4b, 4c, 4d).

The voltage meter 61 includes two resistors 610 and 611 connected in series and a voltage follower 612 configured to receive a divided voltage generated by the resistors 610 and 611. The voltage meter 61 is configured to supply the detection voltage V5 corresponding to the measured output voltage Vout (Vob, Voc, Vod) of the corresponding second power device (4b, 4c, 4d) to the switching controller 62.

The switching controller 62 includes a switching IC 620 configured to receive the detection voltage (output voltage of the voltage follower 612) V5 of the voltage meter 61 and the after-mentioned voltage V8.

The DC-DC converter 63 includes a smoothing capacitor 631, an inductor 632, the switching device 630, a diode 633, and a smoothing capacitor 634 which are arranged in this order from its input side. The DC-DC converter 63 operates to turn on and off the switching device 620 for increasing the input voltage Vin.

The adjusting means 64 includes a CPU 640, two resistors 641 and 642 for dividing an output voltage V6 of the CPU 640, and a non-inverting amplifier circuit 643. The CPU 640 is configured to receive the instruction prescribing the magnitude of the output current Iout from the after-mentioned control unit 73 (see FIG. 1). The non-inverting amplifier circuit 643 is configured to receive a divided voltage generated by the resistors 641 and 642.

The CPU 640 is configured to vary the magnitude of the output current Iout on the basis of the instruction received from the control unit 73 while the power supply apparatus 3 is in operation (the power supply apparatus 3 supplies power to the DC device 102).

As shown in FIG. 1, the monitoring device 7 includes a load current meter 70, a remaining amount meter 71, a judgment unit 72, the control unit (controlling means) 73. The load current meter 70 is configured to measure a remaining amount with regard to each of the cells 161, 162, and 163. The judgment unit 72 is configured to judge whether or not the magnitude of the load current $I_L$ measured by the load current meter 70 is equal to or more than an after-mentioned optimal current magnitude Im. The control unit 73 is configured to control the magnitude of the output current Iout of each of the second power devices 4b, 4c, and 4d.

The load current meter 70 is configured to measure the load current $I_L$. The load current $I_L$ is defined as a total consumption current of the DC devices 102. For example, the load current meter 70 is configured to measure a consumption current of each DC device 102 at a predetermined time interval while the power supply apparatus 3 is in operation (the power supply apparatus 3 supplies power to the DC device 102). Further, the load current meter 70 is configured to determine the load current $I_L$ by calculating the sum of the measured consumption currents. The predetermined time interval may be a time interval (e.g., a few milliseconds) enough to enable a load-following operation. Thus, the load current meter 70 is configured to measure a magnitude (current value) I0 of a current (load current $I_L$) flowing through the DC supply line Wdc and output a measurement indicative of the measured magnitude.

The remaining amount meter 71 measures an output voltage and an output current of each of the cells 161, 162, and 163 at a prescribed time interval while the power supply apparatus 3 is in operation (the power supply apparatus 3 supplies power to the DC device 102). Further, the remaining amount meter 71 calculates the remaining amount of the power stored in each of the cells 161, 162, and 163 on the basis of a detection result (measurements of the output current and the output voltage). The prescribed time interval may be a time interval (e.g., a few milliseconds) enough to enable the load-following operation.

The judgment unit 72 is configured to, upon receiving the measurement from the load current meter 70, judge whether or not the received measurement exceeds the optimal current magnitude Im.

As described in the above, the judgment unit 72 judges whether or not the load current $I_L$ has the magnitude not less than the optimal current magnitude Im. In addition, the judgment unit 72 refers to the remaining amount of the power stored in the secondary cell 162 obtained by the remaining amount meter 71, and judges whether or not the secondary cell 162 stores power sufficient to enable the second power device (BAT converter) 4c connected to the secondary cell 162 to supply the output current Ioc having the same magnitude as the optimal current magnitude Im. For example, upon acknowledging that the remaining amount of the secondary cell 162 is not less than a predetermined threshold, the judgment unit 72 judges that the power left in the secondary cell 162 is enough to enable the second power device 4c to supply the output current Ioc of the optimal current magnitude Im. By contrast, upon acknowledging that the remaining amount of the secondary cell 162 is less than the threshold, the judgment unit 72 judges that the power left in the secondary cell 162 is insufficient to enable the second power device 4c to supply the output current Ioc of the optimal current magnitude Im.

The control unit 73 is configured to decide an amount of power to be supplied from each of the power devices 4a to 4d to the DC devices 102 with regard to a whole system, and adjusts an output of each of the power devices 4a to 4d in response to the decided amount. The control unit 73 transmits the instructions prescribing the magnitudes of the output currents Iob, Ioc, and Iod of the power devices 4b, 4c, and 4d, to the adjusting means 64 of the second power devices 4b, 4c, and 4d, respectively. Here, the instruction may be a numerical amount directly defining a current magnitude. Alternatively, the instruction may be a numerical amount defining a magnitude of a voltage converted from the magnitude of the output current (Iob, Ioc, Iod). Besides, the instruction is not limited to a numerical amount defining the magnitude of the output current (Iob, Ioc, Iod) of the second power device (4b, 4c, 4d). The instruction may be a numerical amount defining output power of the second power device (4b, 4c, 4d).

The CPU 640 shown in FIG. 4 is configured to output the output voltage V6 having its magnitude corresponding to the instruction received from the control unit 73 (see FIG. 1). The non-inverting amplifier circuit 643 is configured to increase its output voltage V7 with an increase of the output voltage V6 of the CPU 640 and to decrease its output voltage V7 with a decrease of the output voltage V6 of the CPU 640.

The current detector 60 has a differential amplifier circuit 606 interposed between the voltage follower 604 and the resistor 605. The differential amplifier circuit 606 is configured to supply, to the switching IC 620, the voltage V8 ($=\beta^*$(V7−V4) ($\beta$>0)) which is proportional to a difference voltage ($=$V7−V4) between the output voltage V7 of the non-inverting amplifier circuit 643 and the detection voltage V4 (the output voltage of the voltage follower 604) of the current meter 60. Even if the detection voltage V4 is not changed, the voltage V8 is increased as the output voltage V6 and the output voltage V7 are increased in accordance with the instruction from the control unit 73. By contrast, the voltage V8 supplied to the switching IC 620 is decreased as the output voltage V6 and the output voltage V7 are decreased. It is noted that "$\beta$" is selected such that the switching IC 620 can make a calculation of the voltage V8 and the detection voltage V5.

The switching IC 620 is configured to output the pulse width modulation signal S2 to the switching device 630. The duty ratio of the pulse width modulation signal S2 is selected (varied) such that a difference voltage ($=$V8−V5) between the voltage V8 and the detection voltage V5 (i.e., a voltage ($=\beta^*V7-(V5+\beta^*V4)$)) is kept constant. For instance, when the voltage ($=\beta^*V7-(V5+\beta^*V4)$) is increased from a preceding one, the switching IC 620 increases the duty ratio of the pulse width modulation signal S2 to reduce the voltage ($=\beta^*V7-(V5+\beta^*V4)$) (to the preceding one). By contrast, when the voltage ($=\beta^*V7-(V5+\beta^*V4)$) is decreased from a preceding one, the switching IC 620 decreases the duty ratio of the pulse width modulation signal S2 to increase the voltage ($=\beta^*V7-(V5+\beta^*V4)$) (to the preceding one).

For example, the switching device 630 is a field-effect transistor. The switching device 630 has its gate receiving the pulse width modulation signal S2 from the switching IC 620 via a resistor 635. While the switching device 630 is turned on, the switching device 630 has its source electrically connected to its drain. Thereby, the inductor 632 continues to accumulate electromagnetic energy. Thereafter, when the switching device 630 is turned off, the inductor 632 discharges the accumulated electromagnetic energy. Thereby, the input voltage Vin is increased. The raised input voltage Vin is smoothed by the smoothing capacitor 634 and is outputted to the DC device 102 (see FIG. 1) as the output voltage Vout.

When the output current Iout (the detection voltage V4) is increased, the voltage ($=\beta^*V7-(V5+\beta^*V4)$) is decreased from a preceding one. In response, the switching IC 620 decreases the duty ratio of the pulse width modulation signal S2 to increase the voltage ($=\beta^*V7-(V5+\beta^*V4)$) to the preceding one. As a result, the output voltage Vout (the detection voltage V5) is decreased. When the output current Iout (the detection voltage V4) is decreased, the voltage ($=\beta^*V7-(V5+\beta^*V4)$) is increased from a preceding one. In response, the switching IC 620 increases the duty ratio of the pulse width modulation signal S2 to reduce the voltage ($=\beta^*V7-(V5+\beta^*V4)$) to the preceding one. As a result, the output voltage Vout (the detection voltage V5) is increased.

As shown in (a) of FIG. 5, each of the second power devices 4b to 4d makes a feedback control to keep the voltage ($=\beta^*V7-(V5+\beta^*V4)$) constant, thereby having its output current-output voltage characteristics (a characteristics of keeping Vout+$\alpha$*Iout constant) of decreasing monotonically (linearly) its output voltage Vout with an increase of its output current Iout.

The line indicative of the output current-output voltage characteristics of the second power device (4b, 4c, 4d) has an intersection point with a line indicative of the output current-output voltage characteristics of the first power device 4a. Therefore, when the second power device (4b, 4c, 4d) is used in combination with the first power device 4a, the output voltage (Vob, Voc, Vod) is coordinated with the output voltage Voa of the first power device 4a. Consequently, the output current (Iob, Ioc, Iod) has its magnitude corresponding to the output voltage (Vob, Voc, Vod) which has the same magnitude as the output voltage Voa.

Figure 6:
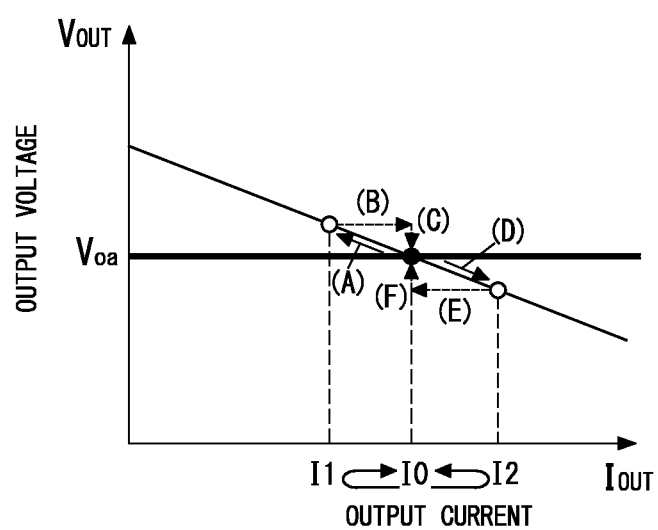
FIG. 6 is an explanatory view illustrating an operation of the second power device of the above power supply apparatus.

When the output current (Iob, Ioc, Iod) decreases, the output voltage (Vob, Voc, Vod) varies depending on the output current-output voltage characteristics shown in FIG. 6, thereby temporarily increasing (see (A) in FIG. 6). As seen from the above, the output current (Vob, Voc, Vod) is increased with an increase of the output voltage (Vob, Voc, Vod). Consequently, the detection voltage V4 also increases (see (B) in FIG. 6). The duty ratio of the pulse width modulation signal S2 decreases because the voltage ($=\beta^*V7-(V5+\beta^*V4)$) decreases with an increase of the detection voltage V4. Thus, the output voltage (Vob, Vob, Vod) (the detection voltage V5) decreases (see (C) in FIG. 6). In due course, the output voltage (Vob, Voc, Vod) becomes identical to the output voltage Voa.

When the output current (Iob, Ioc, Iod) increases, the output voltage (Vob, Voc, Vod) varies depending on the output current-output voltage characteristics shown in FIG. 6, thereby temporarily decreasing (see (D) in FIG. 6). As seen from the above, the output current (Vob, Voc, Vod) is decreased with a decrease of the output voltage (Vob, Voc, Vod). Consequently, the detection voltage V4 also decreases (see (E) in FIG. 6). The duty ratio of the pulse width modulation signal S2 increases because the voltage ($=\beta^*V7-(V5+\beta^*V4)$) increases with a decrease of the detection voltage V4. Thus, the output voltage (Vob, Voc, Vod) (the detection voltage V5) decreases (see (F) in FIG. 6). In due course, the output voltage (Vob, Voc, Vod) becomes identical to the output voltage Voa.

Figure 7:
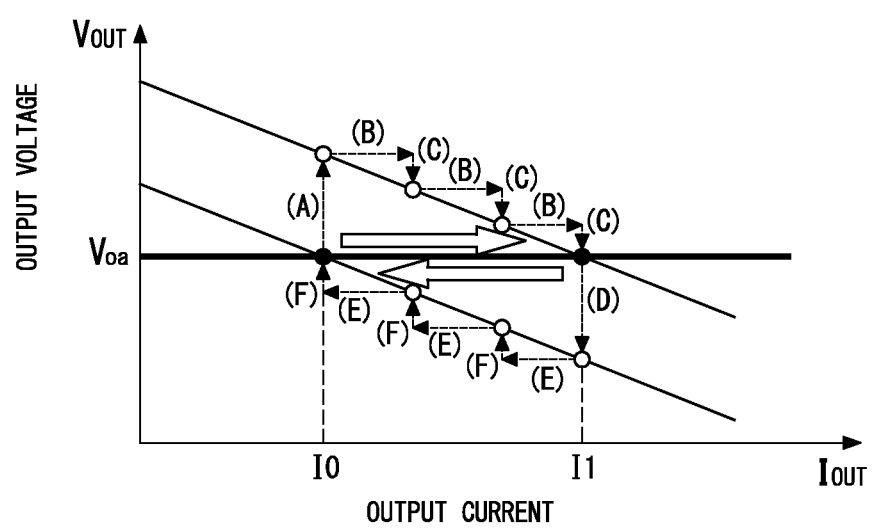
FIG. 7 is an explanatory view illustrating a variation of the output current-output voltage characteristics of the second power device of the above power supply apparatus.

Next, an explanation referring to FIG. 7 is made to an instance where the second power device (4b, 4c, 4d) receives the instruction from the control unit 73. For example, when the total consumption current (load current $I_L$) of the DC devices 102 increases, the control unit 73 provides to the second power device (4b, 4c, 4d) the instruction so as to increase the output current (Iob, Ioc, Iod) yet keep the output voltage (Vob, Voc, Vod) (the detection voltage V5) constant. In response to the instruction, the output voltage V7 and the voltage V8 ($=\beta*V7-V4$)) are increased. Consequently, since the voltage ($=\beta*V7-(V5+\beta*V4)$) is increased, the duty ratio of the pulse width modulation signal S2 is increased. As a result, the output voltage (Vob, Voc, Vod) temporarily exceeds the output voltage Voa (see (A) in FIG. 7). This operation means adding a predetermined voltage to the output voltage (Vob, Voc, Vod) of the second power device (4b, 4c, 4d). When the output voltage (Vob, Voc, Vod) is increased by the addition of the predetermined voltage, the output current (Iob, Ioc, Iod) (the detection voltage V4) is also increased (see (B) in FIG. 7). Since the voltage ($=\beta*V7-(V5+\beta*V4)$) decreases with an increase of the detection voltage V4, the duty ratio of the pulse width modulation signal S2 is decreased. Consequently, the output voltage (Vob, Voc, Vod) is lowered (see (C) in FIG. 7). The second power device (4b, 4c, 4d) repeats this operation. Thereby, the output voltage (Vob, Voc, Vod) becomes identical to the output voltage Voa in due course. As a result, the line indicative of the output current-output voltage characteristics of the second power device (4b, 4c, 4d) is shifted in order to obtain the output current (Iob, Ioc, Iod) at intersections with the line indicative of constant voltage characteristics (the output current-output voltage characteristics of the first power device 4a), thus obtained output current reaching the output current (Iob, Ioc, Iod) corresponding to the instruction (the current magnitude I1).

For example, when the load current $I_L$ decreases, the control unit 73 provides to the second power device (4b, 4c, 4d) the instruction so as to decrease the output current (bob, Ioc, Iod) yet keep the output voltage (Vob, Voc, Vod) (the detection voltage V5) constant. In response to the instruction, the output voltage V7 and the voltage V8 ($=\beta*V7-V4$)) are decreased. Consequently, since the voltage ($=\beta*V7-(V5+\beta*V4)$) is decreased, the duty ratio of the pulse width modulation signal S2 is decreased. As a result, the output voltage (Vob, Voc, Vod) temporarily falls below the output voltage Voa (see (D) in FIG. 7). This operation means subtracting a predetermined voltage from the output voltage (Vob, Voc, Vod) of the second power device (4b, 4c, 4d). When the output voltage (Vob, Voc, Vod) is decreased by the subtraction of the predetermined voltage, the output current (Iob, Ioc, Iod) (the detection voltage V4) is also decreased (see (E) in FIG. 7). Since the voltage ($=\beta*V7-(V5+\beta*V4)$) increases with a decrease of the detection voltage V4, the duty ratio of the pulse width modulation signal S2 is increased. Consequently, the output voltage (Vob, Voc, Vod) is raised (see (C) in FIG. 7). The second power device (4b, 4c, 4d) repeats this operation. Thereby, the output voltage (Vob, Voc, Vod) becomes identical to the output voltage Voa in due course. As a result, the line indicative of the output current-output voltage characteristics of the second power device (4b, 4c, 4d) is shifted in order to obtain the output current (Iob, Ioc, Iod) at intersections with the line indicative of constant voltage characteristics (the output current-output voltage characteristics of the first power device 4a), thus obtained output current reaching the output current (Iob, Ioc, Iod) corresponding to the instruction (the current magnitude I0).

As seen from the above, the adjustment means 64 is configured to, upon receiving the instruction from the control unit (controlling means) 73, modify a condition of the inclination control so as to adjust the output current Iout to a current corresponding to the instruction without varying the output voltage Vout. The adjusting means 64 varies the condition of the inclination control so as to shift (translate) the line indicative of the output current-output voltage characteristics. In other words, the adjusting means 64 makes a translational movement of the line indicative of the output current-output voltage characteristics.

Irrespective of shifting the output current-output voltage characteristics of the second power device (4b, 4c, 4d), the output voltage (Vob, Voc, Vod) of the second power device (4b, 4c, 4d) is coordinated with the output voltage Voa of the first power device 4a. Therefore, the output current (Iob, Ioc, Iod) has its magnitude corresponding to the output voltage (Vob, Voc, Vod) which has the same magnitude as the output voltage Voa of the first power device 4a.

According to the aforementioned configuration, each of the second devices 4b to 4d is enabled to shift its output current-output voltage characteristics on the basis of the instruction received from the control unit 73, as shown in FIG. 7. Even after the output current-output voltage characteristics are shifted, the second power device (4b, 4c, 4d) provides its output voltage (Vob, Voc, Vod) identical to the output voltage Voa of the first power device 4a. Therefore, the output current (Iob, Ioc, Iod) which is outputted from the second device (4b, 4c, 4d) when the output voltage (Vob, Voc, Vod) has the same magnitude as the output voltage Voa can be provided to the DC device 102. Consequently, even if the load current $I_L$ is varied, the power supply apparatus 3 can select the magnitude of the output current (Iob, Ioc, Iod) for the second power device (4b, 4c, 4d) in match with the load current $I_L$. In addition, the output voltage (Vob, Voc, Vod) can be kept constant because the second power device (4b, 4c, 4d) has its output voltage (Vob, Voc, Vod) kept identical to the output voltage Voa of the first power device 4a even if the load current $I_L$ changes its magnitude. Therefore, it is possible to make stable power supply for the DC device 102.

The following explanation is made to an instance. In FIG. 5, (a) shows the output current-output voltage characteristics of the second power device (4b, 4c, 4d), and (b) shows the output current-output voltage characteristics of the first power device 4a. As shown in (c) of FIG. 5, upon receiving the instruction prescribing the magnitude I11 from the control unit 73, the second device (4b, 4c, 4d) translates the line indicative of the output current-output voltage characteristics as indicated by an arrow in (c) of FIG. 5, thereby increasing the magnitude of the output current Iout of the second device (4b, 4c, 4d) from the magnitude I12 to the magnitude I11.

Additionally, in the present embodiment, the first power device 4a receives the voltage from the commercial power source AC which is configured to supply stable power. Therefore, it is possible to reduce an influence of a load variation caused by an on-off operation of the DC device 102. Thus, it is enabled to make more stable power supply for the DC device 102. By contrast, when the first power device 4a is connected to the solar cell 161, the power supply to the DC device 102 becomes unstable due to solar insolation. When the first power device 4a is connected to the secondary cell 162, the power supply to the DC device 102 becomes unstable due to a charging status of the secondary cell 162.

The second power device (4b, 4c, 4d) has a configuration for monotonically decreasing the output voltage Vout with an increase of the output current Iout. This configuration can be implemented by slight modification to the configuration of the first power device 4a only with exception of few additional parts.

The next explanation is made to the monitoring device 7 shown in FIG. 1. In the following explanation, the optimal current magnitude Im is defined as the magnitude of the output current Ioc of the second power device 4c operating so as to maximize an efficiency η3 (a proportion of the output power of the second power device 4c to the sum of the output power of the secondary cell 162 and a loss caused by an internal resistance "r" of the secondary cell 162) regarding a combination of the secondary cell 162 and the second power device (BAT converter) 4c.

The control unit 73 is configured to, upon acknowledging that the judgment unit 72 determines that the measurement (the magnitude of the load current $I_L$) I0 exceeds the optimal current magnitude Im, send the instruction to the second power device 4c such that the magnitude of the current Ioc supplied from the main power device (the second power device) 4c to the DC power line Wdc is identical to the optimal current magnitude Im.

In particular, the control unit 73 is configured to, upon acknowledging that the judgment unit 72 determines that the measurement I0 exceeds the optimal current magnitude Im, send the instruction to the second power device 4c such that the output current Ioc of the second power device 4c has the same magnitude as the optimal current magnitude Im while the output voltage Voc of the main power device (the second power device) 4c is equal to a voltage supplied to the DC supply line Wdc from the commercial power device (the first power device) 4a.

In this situation, upon receiving the instruction from the control unit 73, the adjusting means 64 of the second power device 4c modifies the condition of the inclination control so as to adjust the output current Ioc to a current corresponding to the received instruction without varying the output voltage Voc.

In brief, upon acknowledging that the magnitude of the load current $I_L$ measured by the load current meter 70 exceeds the optimal current magnitude Im, the control unit 73 of the monitoring device 7 translates the line indicative of the output current-output voltage characteristics by use of the adjusting means 64 (see FIG. 4) of the second power device 4c such that the magnitude of the output current Ioc of the second power device 4c having the output voltage Voc equal to the output voltage Voa of the first power device 4a is identical to the optimal current magnitude Im.

In addition, the control unit is configured to, upon acknowledging that the judgment unit determines that the measurement I0 exceeds the optimal current magnitude Im, send the instruction (second instruction) to the second power device 4b such that the output current (second output current) Iob of the inclination output power device (second power device) 4b has the same magnitude as a difference between the measurement I0 and the optimal current magnitude Im.

In this situation, upon receiving the second instruction from the control unit 73, the adjusting means (second adjusting means) 64 of the second power device 4b modifies the condition of the inclination control (second inclination control) so as to adjust the output current (second output current) Iob to a current corresponding to the received second instruction without varying the output voltage (second output voltage) Vob.

In brief, the control unit 73 makes a translation movement of the line indicative of the output current-output voltage characteristics by use of the adjusting means 64 of the second power device 4b so as to compensate for a difference current between the load current $I_L$ and the output current Ioc of the second power device 4c with the output current Iob of the second power device (PV converter) 4b.

In the present embodiment, the commercial power device (the first power device 4a) is configured to, when the inclination output power device (second power device 4b) fails to supply the second output current Vob having the magnitude corresponding to the second instruction, supply to the DC supply line Wdc the current (output current) Ioa having the same magnitude as a difference between the measurement I0 and the sum of the output current Voc of the main power device (second power device 4c) and the second output current Vob of the inclination output power device (second power device 4b).

Namely, in response to occurrence of an event where the second power device (PV converter) 4b fails to compensate for the difference current, the first power device 4a compensates for the difference current.

In a modified example, the second power device 4b and 4d are used as the inclination output power device. However, even in this modified example, an event where neither the second power device (PV converter) 4b nor the second power device (FC converter) 4d can compensate for the difference current is likely to occur. Therefore, in response to occurrence of this event, the first power device 4a compensates for the difference current.

Next, an explanation referring to FIG. 11 is made to the efficiency of the secondary cell 162 and the second power device (BAT converter) 4c with regard to the aforementioned power supply apparatus 3. In the following explanation, the secondary cell "B" shown in (a) of FIG. 11 is treated as the secondary cell 162, and the power device "A" shown in (a) of FIG. 11 is treated as the second power device 4c.

The secondary cell 162 has an internal resistance "r" (see (a) in FIG. 11) considered to be connected in series with an ideal voltage source "E" developing electromotive force. Therefore, as shown in (b) of FIG. 11, the secondary cell 162 has a characteristic line indicating that an efficiency η1 (a proportion of output power of the secondary cell 162 to the sum of the output power of the secondary cell 162 and power loss caused by the internal resistance "r") is decreased with an increase of the output current of the secondary battery 162. Besides, with regard to the secondary cell 162, the internal resistance "r" varies with the remaining amount and/or the operating time period, and the efficiency η1 varies with the internal resistance "r". Therefore, the monitoring device 7 preliminarily stores the characteristics line of the efficiency η1 for each remaining amount and each operating time period before the present apparatus starts to supply power.

The second power device 4c has internal loss such as conduction loss in the DC/DC converter 63 (FIG. 4). Therefore, the second power device 4c has a characteristic line with regard to an efficiency η2 as shown in (c) of FIG. 11. The efficiency η2 is defined as a proportion of output power (=Voc*Ioc) of the second power device 4c to input power (=Vin*Iin) of the second power device 4c. The input power of the second power device 4c is defined as the sum of the output power of the second power device 4c and the internal loss of the second power device 4c. Therefore, the monitoring device 7 preliminarily stores the characteristics line of the efficiency η2.

As apparent from (b) and (c) in FIG. 11, with regard to a combination of the secondary cell 162 and the second power device 4c, the efficiency η3 (a proportion of the output power of the second power device 4c to the sum of the output power of the secondary cell 162 and the loss caused by the internal resistance "r") becomes a maximum at a specific output current of the second power device 4c, as shown in (d) of FIG. 11. The optimal current magnitude Im is defined as the magnitude of the output current Ioc corresponding to the maximal efficiency η3. The control unit 73 calculates the characteristic line of the efficiency η3 shown in (d) of FIG. 11 with reference to the characteristic lines of the efficiencies η1 and η2 respectively shown in (b) and (c) of FIG. 11. Thereafter, the control unit 73 determines the optimal current magnitude Im with reference to the calculated characteristic line of the efficiency η3.

As mentioned in the above, the internal resistance "r" of the secondary cell 162 varies with the remaining amount and/or the operating time period. Therefore, the control unit 73 may be configured to respectively compare an initial voltage and initial current of the secondary cell 162 with the output voltage and the output current of the secondary cell 162 measured by the remaining amount meter 71. With this arrangement, the control unit 73 can operate in response to the variation of the efficiency η1 of the secondary cell 162. The efficiency η3 varies with the efficiency η1 and further the optimal current magnitude Im varies with the efficiency η1. Thus, the control unit 73 can adjust the magnitude of the output current Ioc of the second power device 4c in response to a variation of the efficiency η1 of the secondary cell 162.

Figure 8:
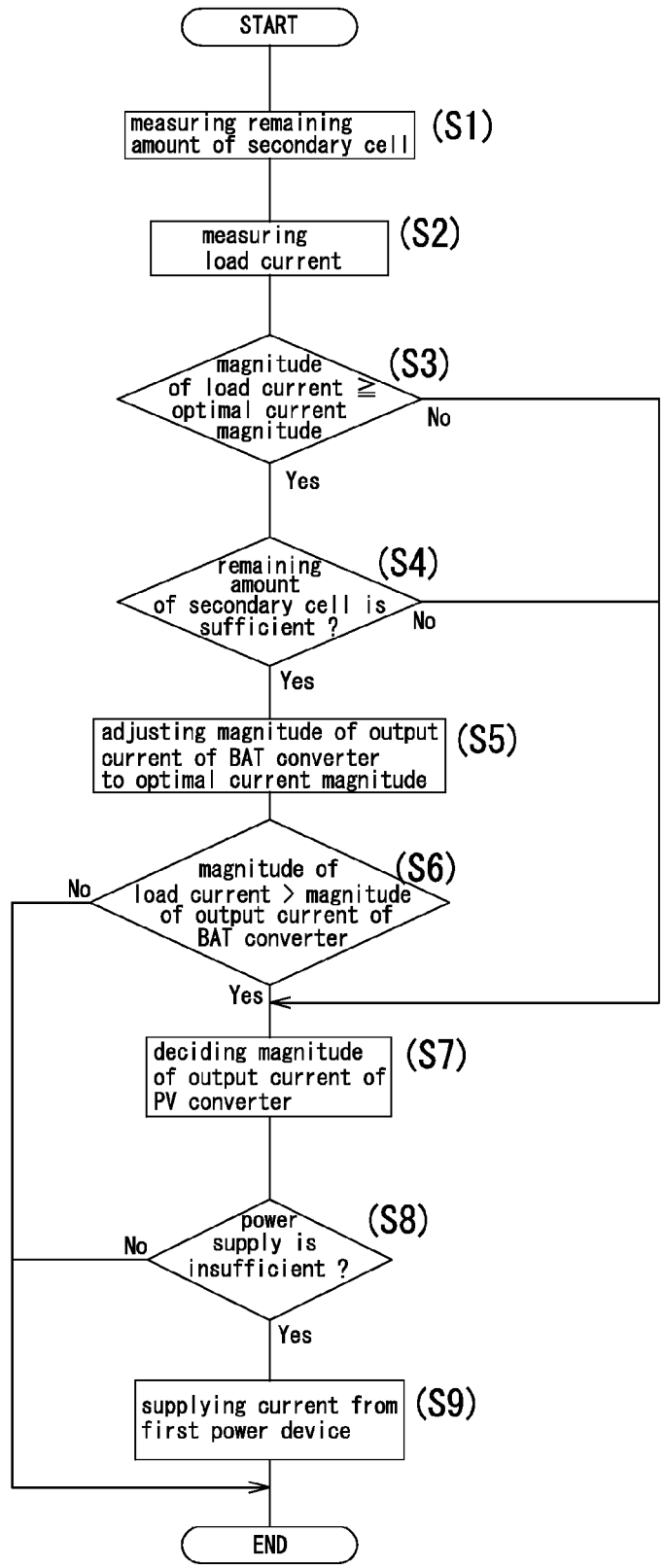
FIG. 8 is a flowchart illustrating an operation of the above power supply apparatus.

Next, an explanation referring to FIG. 8 is made to the operation for efficient use of the secondary cell 162 with regard to the power supply apparatus 3 in accordance with the present embodiment.

First, the remaining amount meter 71 measures the remaining amount of the power stored in the secondary cell 162 (S1 in FIG. 8) and the load current meter 70 measures the magnitude I0 of the load current $I_L$ (S2). Next, the judgment unit 72 judges whether or not the magnitude I0 of the load current $I_L$ is equal to or more than the optimal current magnitude Im (S3). Upon judging that the magnitude I0 is not less than the optimal current magnitude Im, the judgment unit 73 further judges whether or not the secondary cell 162 stores power enough to enable the second power device (BAT converter) 4c to supply the output current Ioc having the same magnitude as the optimal current magnitude Im (S4). Upon acknowledging that the judgment unit 72 judges that the remaining amount of the secondary cell 162 is sufficient, the control unit 73 sends, to the second power device 4c, the instruction for adjusting the magnitude of the output current Ioc to the optimal current magnitude Im. Upon receiving the instruction from the control unit 73, the second power device 4c controls its adjusting means 64 (see FIG. 4) to make the translation movement of the line indicative of the output current-output voltage characteristics of the second power device 4c, thereby supplying the output current Ioc having its magnitude equal to the optimal current magnitude Im to the DC device 102, as shown in (c) of FIG. 9 (S5).

Subsequently, as shown in FIG. 8, the judgment unit 72 judges whether or not the load current $I_L$ exceeds the output current Ioc of the second power device 4c (S6). When the magnitude I0 of the load current $I_L$ is greater than the magnitude of the output current Ioc, the control unit 73 sends, to the second power device 4b, the instruction for adjusting the magnitude of the output current Iob of the second power device (PV converter) 4b to the difference (=I0−Im) between the magnitude I0 and the optimal current magnitude Im within the available power range of the solar cell 161. Upon receiving the instruction from the control unit 73, the second power device 4b controls its adjusting means 64 to make the translation movement of the line indicative of the output current-output voltage characteristics of the second power device 4b, thereby supplying the output current Iob having the same magnitude as the difference (=I0−Im) to the DC device 102 (S7).

Figure 9:
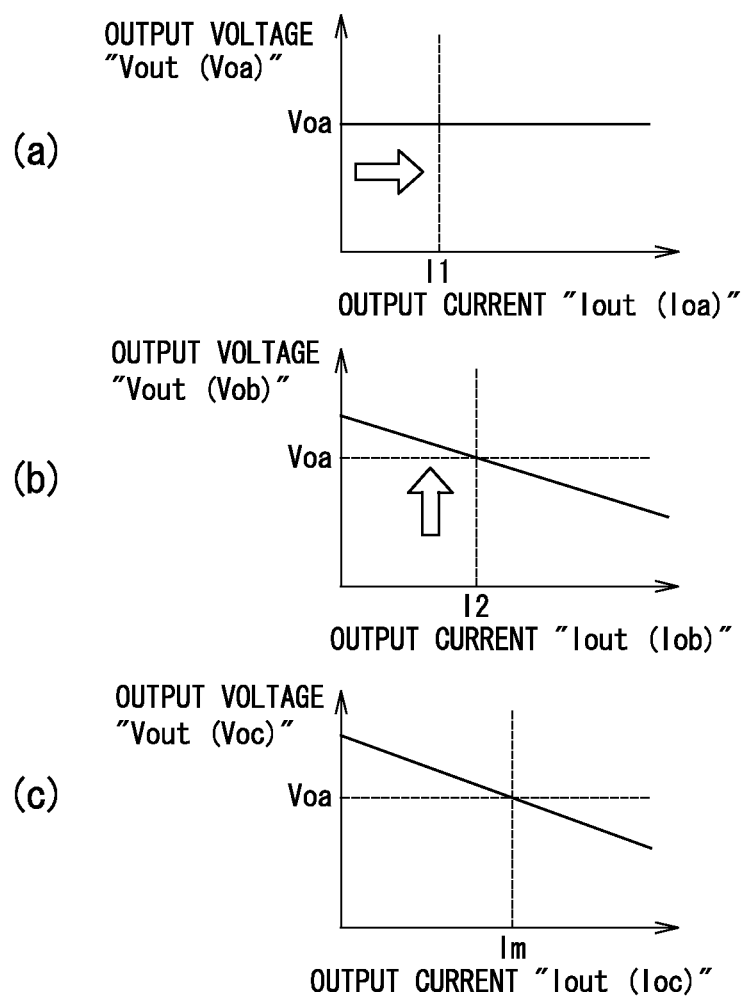
FIG. 9 shows a diagram (a) illustrating the output current-output voltage characteristics of the first power device of the above power supply apparatus, a diagram (b) illustrating output current-output voltage characteristics of the PV converter of the above power supply apparatus, and a diagram (c) illustrating output current-output voltage characteristics of the BAT converter of the above power supply apparatus.

As shown in (b) of FIG. 9, when the maximum magnitude I1 of the output current Iob of the second power device 4b is less than the difference (=I0−Im) (i.e., I0−Im>I1) (S8), the first power device 4a supplies its output current Ioa having the magnitude I1 (=I0−I2−Im) to the DC device 102 as shown in (a) of FIG. 9 (S9). In brief, the first power device 4a supplies the output current Ioa in order to compensate for a deficit current which occurs when the output current Iob of the second power device 4b is insufficient to compensate for the difference current between the load current $I_L$ and the output current Ioc of the second power device 4c.

According to the steps S7 to S9, the second power device (PV converter) 4b is used for compensating for the difference (=I0−Im) prior to the other power device (BAT converter) 4a. Therefore, it is possible to promote energy conservation.

A next explanation is made to an alternative example of the steps S8 and S9. Upon receiving the difference (=I0−Im), the control unit 73 may make instant judgment on the basis of calculation. That is, the control unit 73 judges whether or not the maximum magnitude I1 of the output current Iob supplied from the second power device (PV converter) 4b at the present insolation condition is less than the difference. Upon acknowledging that the maximum magnitude I1 is less than the difference, the control unit 73 judges that the first power device 4a should supply power. Then, the control unit 73 sends the instruction to the second power device 4b such that the output current Iob of the second power device 4b has the maximum magnitude I1.

When the magnitude I0 of the load current $I_L$ is judged to be less than the optimal current magnitude Im in the step S3, or when the power left in the secondary cell 162 is judged to be insufficient to enable the second power device 4c to provide the output current Ioc having the same magnitude as the optimal current magnitude Im in the step S4, the second power device 4c does not supply the output current Ioc. Further, the second power device 4b makes the translation movement of the line indicative of the output current-output voltage characteristics of the second power device 4b shown in (b) of FIG. 9, thereby supplying the output current Iob having the maximum magnitude I1 to the DC device 102 (S7). Thereafter, the step S8 is performed.

In a modified example, the power supply apparatus 3 may include a plurality of the second power devices (BAT converter) 4c. In this modified example, when the magnitude I0 of the load current $I_L$ is judged to be less than the optimal current magnitude Im in the step S3, the one second power device 4c supplies its output current Ioc having the same magnitude as the optimal current magnitude Im. Therefore, a surplus current (=Im−I0) can be used for charging up the other second power devices 4c.

The power supply apparatus 3 may be configured to perform the operations respectively defined by the steps S1 to S8 regularly (at a predetermined time interval). With this arrangement, it is possible to adjust the output current in response to a variation of a supply capacity of the cell (161, 162, 163) or the magnitude of the load current. Besides, the predetermined time interval may be a time interval (e.g., a few milliseconds) enough to enable the load-following operation. In addition, the power supply apparatus 3 may perform the operations respectively defined by the steps S1 to S8 irrespective of the predetermined time interval.

As described in the above, the power supply apparatus 3 of the present embodiment, the secondary cell dedicated power device (second power device) 4c, the one or more other power devices 4, the load current meter (load current measuring means) 70, and the control unit (controlling means) 73. The secondary cell dedicated power device 4c is configured to receive power from the secondary cell 162 connected thereto and supply DC power to the load device 102. The one or more other power devices 4 are operated simultaneously with the second power device 4c to supply DC power to the load device 102. The load current meter 70 is configured to measure the load current $I_L$ supplied to the load device 102. The control unit 73 is configured to control the magnitude of the output current Ioc of the second power device 4c. The second power device 4c includes the adjusting means 64 configured to adjust the magnitude of the output current Ioc of the second power device 4c in response to the control of the control unit 73. The optimal current magnitude Im is defined as the magnitude of the current Ioc supplied to the DC supply line Wdc from the second power device 4c which operates so as to maximize the efficiency η3. The efficiency η3 represents the proportion of the output power of the second power device 4c to the sum of the output power of the secondary cell 162 and the loss caused by the internal resistance r of the secondary cell 162. The control unit 73 is configured to, upon acknowledging that the load current $I_L$ measured by the load current meter 70 has its magnitude equal to or more than the optimal current magnitude Im, control the adjusting unit 64 so as to adjust the magnitude of the output current Ioc of the second power device 4c to the optimal current magnitude Im. The one or more other power devices 4 are configured to supply the output current corresponding to the difference between the load current $I_L$ and the output current Ioc of the second power device 4c.

In other words, the power supply apparatus 3 of the present embodiment includes the main power device (second power device) 4c, the auxiliary power unit, the load current meter (load current measuring means) 70, the judgment unit (judging means) 72, and the control unit (controlling means) 73. Each of the main power device 4c and the auxiliary power unit is adapted to be connected to the DC supply line Wdc to be connected to the load device 102 and is configured to supply DC power to the load device 102 through the DC supply line Wdc. The load current meter 70 is configured to measure the current (load current) $I_L$ flowing through the DC supply line Wdc and output the measurement indicative of the magnitude (current value) I0 of the measured current. The judgment unit 72 is configured to, upon obtaining the measurement I0 from the load current meter 70, judge whether or not the obtained measurement I0 exceeds the optimal current magnitude Im. The second power device 4c is configured to generate the DC power supplied to the load device 102 by use of power supplied from the secondary cell 162 connected thereto. The optimal current magnitude Im is defined as the magnitude of the current Ioc supplied to the DC supply line Wdc from the second power device 4c which operates so as to maximize the proportion of the power supplied from the second power device 4c to the DC supply line Wdc to the sum of the power supplied from the secondary cell 162 to the second power device 4c and the loss caused by the internal resistance r of the secondary cell 162. The control unit 73 is configured to, upon acknowledging that the judgment unit 72 determines that the measurement I0 exceeds the optimal current magnitude Im, send the instruction to the second power device 4c such that the magnitude of the current (output current) Ioc supplied from the second power device 4c to the DC power line Wdc is identical to the optimal current magnitude Im. The second power device 4c includes the adjusting means 64 configured to adjust the current Ioc supplied from the second power device 4c to the DC supply line Wdc on the basis of the instruction received from the control unit 73.

Further, the auxiliary power unit is configured to supply to the DC supply line Wdc the current having the same magnitude as the difference between the magnitude of the current Ioc supplied from the second power device 4c to the DC supply line Wdc and the optimal current magnitude Im while the adjusting means 64 of the second power device 4c supplies to the DC supply line Wdc the current Ioc corresponding to the instruction received from the control unit 73.

According to the present embodiment, when the magnitude of the load current $I_L$ is equal to or more than the magnitude (optimal current magnitude Im) of the output current Ioc supplied from the second power device 4c operating so as to maximize the efficiency η3 (the proportion of the output power of the second power device (BAT converter) 4c to the sum of the output power of the secondary cell 162 and the loss caused by the internal resistance "r" of the secondary cell 162), the second power device 4c supplies the output current Ioc having the same magnitude as the optimal current magnitude Im. Therefore, it is possible to operate the second power device 4c at the maximal efficiency regarding the combination of the secondary cell 162 and the second power device 4c.

Further, in the power supply apparatus 3 of the present embodiment, the other power devices 4 includes the commercial power source dedicated power device (first power device) 4a configured to receive the power from the commercial power source AC and supply the output voltage of the DC voltage which is a constant voltage irrespective of the magnitude of the output current Ioa. The second power device 4c is configured to supply the output voltage Voc of the DC voltage which is decreased with an increase of the output current Ioc. The adjusting means 64 is configured to shift (translate) the line indicating the output current-output voltage characteristics defining the relation between the output current Ioc and the output voltage Voc during the power supply to the load device 102. The control unit 73 is configured to, upon acknowledging that the load current $I_L$ measured by the load current meter 70 has the magnitude equal to or more than the optimal current magnitude Im, shift (translate) the line indicative of the output current-output voltage characteristics by use of the adjusting means 64 of the second power device 4c such that the magnitude of the output current Ioc of the second power device 4c having the output voltage Voc equal to the output voltage Voa of the first power device 4a is identical to the optimal current magnitude Im.

Stated in a different fashion, in the power supply apparatus 3 of the present embodiment, the auxiliary power unit includes the commercial power device (first power device) 4a is configured to convert the power obtained from the commercial power source AC connected thereto to the DC power so as to perform the constant voltage control of supplying the constant voltage (output voltage) Voa to the DC supply line Wdc irrespective of the current (output current) Ioa supplied therefrom to the DC supply line Wdc. The second power device 4c is configured to perform the inclination control of monotonically decreasing its output voltage Voc supplied therefrom to the DC supply line Wdc with an increase of its output current Ioc supplied therefrom to the DC supply line Wdc, and of monotonically increasing the output voltage Voc with a decrease of the output current Ioc. The control unit 73 is configured to, upon acknowledging that the judgment unit 72 determines that the measurement I0 exceeds the optimal current magnitude Im, send the instruction to the second power device 4c such that the output current Ioc of the second power device 4c has the same magnitude as the optimal current magnitude Im while the output voltage Voc of the second power device 4c is equal to the voltage (output voltage) Voa supplied to the DC supply line Wdc from the first power device 4a. The adjusting means 64 of the second power device 4c is configured to, upon receiving the instruction from the control unit 73, modify the condition of the inclination control so as to adjust the output current Ioc to the current corresponding to the instruction without varying the output voltage Voc.

The optimal current magnitude Im (see (d) of FIG. 11) may be varied when the secondary cell 162 connected to the second power device 4c is replaced by a secondary cell having different characteristics from the secondary cell 162, or when the characteristics of the secondary cell 162 are varied in use. However, the present embodiment shifts (translates) the line indicating the output current-output voltage characteristics of the second power device 4c. Therefore, it is possible to adjust, to the optimal current magnitude Im, the magnitude of the output current Ioc supplied from the second power device 4c having the output voltage Voc equal to the output voltage Voa of the first power device 4a.

Moreover, the power supply apparatus 3 of the present embodiment includes the inclination output power device (second power device) 4b as one of the other power devices 4. The inclination output power device (second power device) 4b is configured to receive power and output the output voltage Vob of the DC voltage which is decreased with an increase of the output current Iob. The second power device 4b includes the second adjusting means 64 configured to shift (translate) the line indicating the output current-output voltage characteristics defining the relation between the output current Iob and the output voltage Vob during the power supply to the load device 102. The control unit 73 is configured to shift (translate) the line indicative of the output current-output voltage characteristics by use of the second adjusting means 64 such that the second power device 4b supplies the output current Iob having the same magnitude as the difference between the magnitude of the load current $I_L$ and the optimal current magnitude Im.

Said differently, in the power supply apparatus 3 of the present embodiment, the auxiliary power unit includes the inclination output power device (second power device) 4b. The second power device 4b is configured to perform the inclination control (second inclination control) of monotonically decreasing its output voltage (second output voltage) Vob supplied therefrom to the DC supply line Wdc with an increase of its output current (second output current) Iob supplied therefrom to the DC supply line Wdc, and of monotonically increasing the second output voltage Vob with a decrease of the second output current Iob. The control unit (controlling means) 73 is configured to, upon acknowledging that the judgment unit (judging means) 72 determines that the measurement I0 exceeds the optimal current magnitude Im, send the instruction (second instruction) to the second power device 4b such that the second output current Iob of the second power device 4b has the same magnitude as the difference between the measurement I0 and the optimal current magnitude Im. The second power device 4b includes the adjusting means (second adjusting means) 64 configured to adjust the second output current Iob on the basis of the received second instruction. The second adjusting means 64 is configured to, upon receiving the second instruction from the control unit 73, modify the condition of the second inclination control so as to adjust the second output current Iob to the current corresponding to the second instruction without varying the second output voltage Vob.

Further, in the power supply apparatus 3 of the present embodiment, the commercial power source dedicated power device (first power device) 4a is configured to supply the output current Ioa corresponding to the deficit current remaining even when the inclination output power device (second power device) 4b supplies the output current Iob in order to reduce the difference between the load current $I_L$ and the output current Ioc of the second power device 4c.

In other words, in the power supply apparatus 3 of the present embodiment, the commercial power device (first power device) 4a is configured to, when the inclination output power device (second power device) 4b fails to supply the output current (second output current) Iob having the magnitude corresponding to the instruction (second instruction), supply to the DC supply line Wdc the current (output current) Ioa having the same magnitude as the difference between the measurement I0 and the sum of the output current Ioc of the main power device (second power device) 4c and the second output current Iob of the second power device 4b.

As described in the above, according to the present embodiment, the second power device 4b connected to the solar cell 161 compensates for the difference current when the load current $I_L$ has the magnitude greater than the optimal current magnitude Im. Therefore, the apparatus can adjust supply power in response to a variation of current required by the load current. In the aforementioned instance, the first power device 4a connected to the commercial power source AC compensates for the deficit current last. Therefore, in comparison to an instance where the first power device 4a compensates for the deficit current first or earlier than the second power device 4b, it is possible to reduce a consumed amount of power supplied from the commercial power source AC.

In the present embodiment, when the load current $I_L$ has the magnitude greater than the optimal current magnitude Im, the second power device (PV converter) 4b compensates for the difference current. In a modified example, the second power device (FC converter) 4d may compensate for the difference current instead of the second power device 4b. In this modified example, the second power device 4d is treated as the aforementioned inclination output power device, and the adjusting means 64 (see FIG. 4) of the second power device 4d is treated as the aforementioned second adjusting means.

Alternatively, the second power devices 4b and 4d may cooperate to compensate for the difference current. In this instance, the second power devices 4b and 4d are treated as the aforementioned inclination output power device, and the adjusting means 64 (see FIG. 4) of the second power devices 4b and 4d are treated as the aforementioned second adjusting means.

Second Embodiment

The power supply apparatus 3 in accordance with the second embodiment is different from the power supply apparatus 3 in accordance with the first embodiment in the following points. That is, in the second embodiment, when the load current $I_L$ has the magnitude less than the optimal current magnitude Im, the second power device (PV converter) 4b does not supply the output current Iob but the second power device (BAT converter) 4c supplies the output current Ioc. Besides, configurations common to the present embodiment and the first embodiment are designated by the same reference numerals and no explanations thereof are deemed necessary.

Like the first embodiment, the judgment unit 72 of the present embodiment judges whether or not the load current $I_L$ has the magnitude equal to or more than the optimal current magnitude Im, and judges whether or not the secondary cell 162 stores power sufficient to enable the second power device 4c to supply the output current Ioc having the same magnitude as the optimal current magnitude Im. In addition, upon judging that the load current $I_L$ has the magnitude less than the optimal current magnitude Im, the judgment unit 72 judges whether or not the secondary cell 162 stores power sufficient to enable the second power device 4c to supply the output current Ioc having the same magnitude as the magnitude I0 of the load current $I_L$. For example, upon acknowledging that the remaining amount of the secondary cell 162 is not less than a predetermined second threshold, the judgment unit 72 judges that the power left in the secondary cell 162 is enough to enable the second power device 4c to supply the output current Ioc having the same magnitude as the magnitude I0 of the load current $I_L$. By contrast, upon acknowledging that the remaining amount of the secondary cell 162 is less than the second threshold, the judgment unit 72 judges that the power left in the secondary cell 162 is insufficient to enable the second power device 4c to supply the output current Ioc having the magnitude identical to the magnitude I0 of the load current $I_L$.

Figure 10:
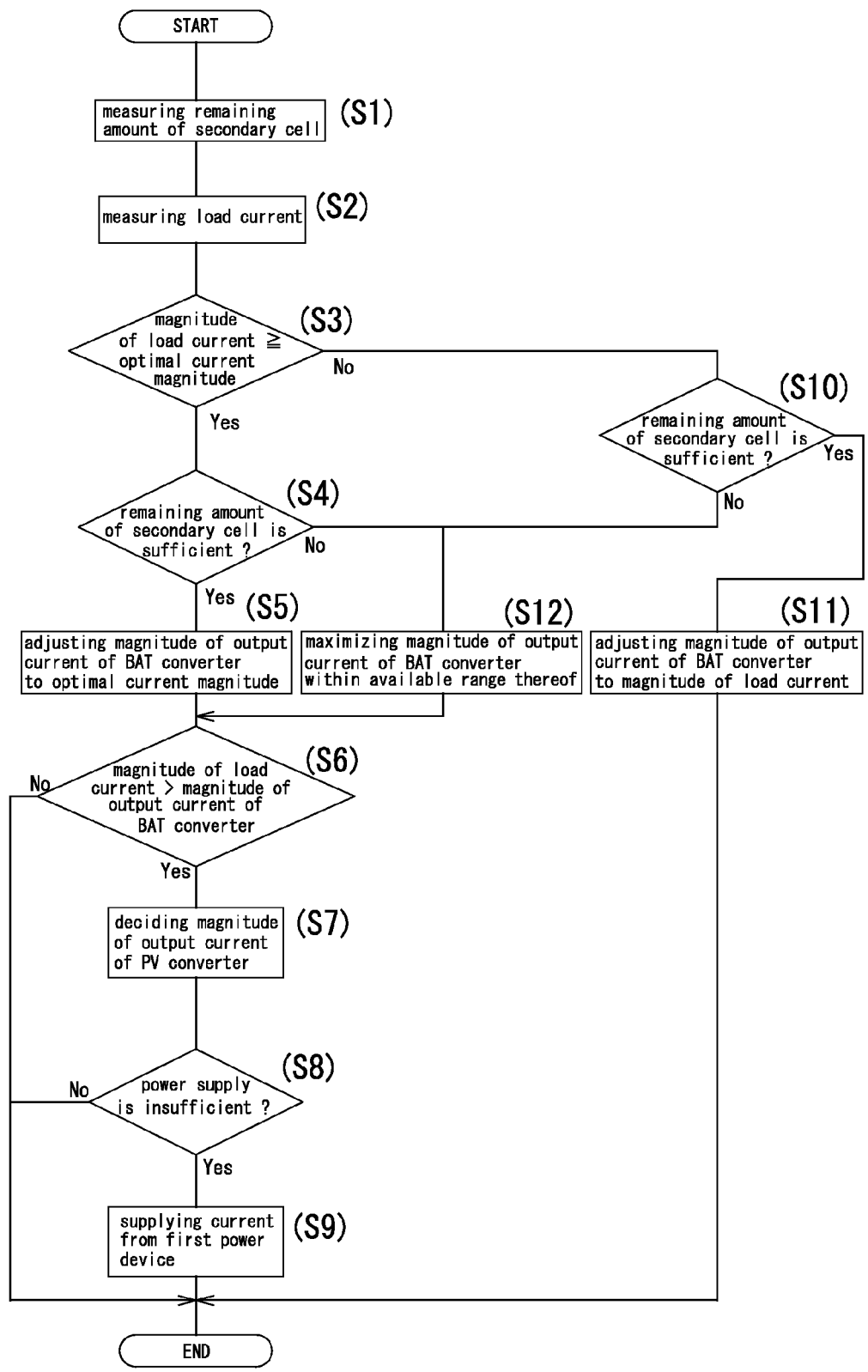
FIG. 10 is a flowchart illustrating an operation of the power supply apparatus of the second embodiment.

An explanation referring FIG. 10 is made to the operation of the power supply apparatus 3 of the present embodiment. First, like the first embodiment, the remaining amount meter 71 measures the remaining amount of the power left in the secondary cell 162 (S1 in FIG. 10) and the load current meter 70 measures the load current $I_L$ (S2). The judgment unit 72 judges whether or not the magnitude I0 of the load current $I_L$ is equal to or more than the optimal current magnitude Im (S3). When the judgment unit 72 judges that the magnitude I0 of the load current $I_L$ is not less than the optimal current magnitude Im, the present embodiment performs the same operation as the first embodiment (S4 to S9).

With regard to the step S3, upon judging that the load current $I_L$ has the magnitude I0 less than the optimal current magnitude Im, the judgment unit 72 judges whether or not the secondary cell 162 stores power sufficient to enable the second power device (BAT converter) 4c to supply the output current Ioc having the same magnitude as the magnitude I0 of the load current $I_L$ (S10). When the judgment unit 72 judges that the remaining amount of the secondary cell 162 is sufficient, the control unit 73 sends the second power device 4c the instruction for adjusting the magnitude of the output current Ioc to the magnitude I0 of the load current $I_L$. Upon receiving the instruction from the control unit 73, the second power device 4c makes the translation movement of the line indicative of the output current-output voltage characteristics of the second power device 4c by use of the adjusting means 64 (see FIG. 4), thereby supplying the output current Ioc of the magnitude I0 to the DC device 102 (S11).

With regard to the step S10, when the secondary cell 162 stores power insufficient to enable the second power device 4c to supply the output current Ioc having the same magnitude as the magnitude I0 of the load current $I_L$, the control unit 73 sends the second power device 4c the instruction for maximizing the output current Ioc within the available range of the secondary cell 162. Upon receiving the instruction from the control unit 73, the second power device 4c shifts (translate) the line indicative of the output current-output voltage characteristics of the second power device 4c by use of the adjusting means 64, thereby supplying the output current Ioc maximized within the available range to the DC device 102 (S12). Subsequently, the step S6 is performed.

As described in the above, the present embodiment operates the second power device 4c connected to the secondary cell 162 when the load current $I_L$ has the magnitude less than the optimal current magnitude Im. Consequently, it is possible to reduce a consumption amount of power supplied from each of the other voltage source.

Third Embodiment

The power supply apparatus 3 in accordance with the third embodiment is different from the power supply apparatus 3 in accordance with the first embodiment in the following points. That is, in the third embodiment, when the second power device (PV converter) 4b fails to compensate for the deficit current with the maximized output current Iob (I0>I2+Im), the second power device (FC converter) 4d connected to the fuel cell 163 supplies to the DC device 102 in order to compensate for the current shortage instead of the first power device 4a connected to the commercial power source AC. Besides, configurations common to the present embodiment and the first embodiment are designated by the same reference numerals and no explanations thereof are deemed necessary.

The judgment unit 73 is configured to judge whether or not the measurement (the magnitude of the load current $I_L$) I0 exceeds the sum (=I2+Im) of the optimal current magnitude Im and the maximum I1 of the output current Iob of the second power device 4b.

The judgment unit 73 is configured to judge whether or not the measurement (the magnitude of the load current $I_L$) I0 exceeds the sum (=I2+Im) of the optimal current magnitude Im and the maximum I1 of the output current Iob of the second power device 4b.

As apparent from the above, upon acknowledging that the current shortage occurs even when the second power device 4b supplies the maximized output current Iob, the control unit of the present embodiment 73 sends to the second power device 4d the instruction for adjusting the magnitude of the output current Iod of the second power device 4d to the magnitude of the deficit current. Upon receiving the instruction from the control unit 73, the second power device 4d shifts (translate) the line indicative of the output current-output voltage characteristics of the second power device 4d by use of the adjusting means 64 (see FIG. 4), thereby supplying to the DC device 102 the output current Iod having the same magnitude as the deficit current.

As explained in the above, the present embodiment uses the second power device 4d connected to the fuel cell 163 in order to compensate for the deficit current. Consequently, it is possible to reduce a consumed amount of power supplied from the AC system.

Besides, it is assumed that the second power device (PV converter) 4b fails to compensate for the deficit current even when the output current Iob is maximum (I0>I2+Im). In this situation, according to the first embodiment, the first power device 4a supplies to the DC device 102 the current having the same magnitude as the deficit current in the first embodiment. By contrast, according to the third embodiment, the second power device (FC converter) 4d supplies to the DC device 102 the current having the same magnitude as the deficit current. However, in a modified example, the first power device 4a and the second power device 4d may be operated simultaneously to supply to the DC device 102 the current having the same magnitude as the deficit current. Therefore, in comparison to an instance where only the first power device 4a provides to the DC device 102 the current having the same magnitude as the deficit current, it is possible to reduce a consumed amount of power supplied from the AC system.

The invention claimed is:

1. Power supply apparatus comprising:
a main power device and an auxiliary power unit each adapted to be connected to a DC supply line to be connected to a load device and configured to supply DC power to said load device through the DC supply line;
load current measuring means configured to measure a current flowing through the DC supply line and output a measurement indicative of a magnitude of the measured current;
judging means configured to, upon obtaining the measurement from said load current measuring means, judge whether or not the obtained measurement exceeds an optimal current magnitude; and
controlling means,
wherein said main power device is configured to generate the DC power supplied to the load device by use of power supplied from a secondary cell connected thereto,
the optimal current magnitude being defined as a magnitude of a current supplied to the DC supply line from said main power device which operates so as to maximize a proportion of power supplied from said main power device to the DC supply line to the sum of power supplied from the secondary cell to said main power device and loss caused by an internal resistance of the secondary cell,
said controlling means being configured to, upon acknowledging that said judging means determines that the measurement exceeds the optimal current magnitude, send an instruction to said main power device such that a magnitude of the current supplied from said main power device to the DC power line is identical to the optimal current magnitude, and
said main power device including adjusting means configured to adjust the current supplied from said main power device to the DC supply line on the basis of the instruction received from said controlling means.

2. Power supply apparatus as set forth in claim 1, wherein said auxiliary power unit includes a commercial power device,
said commercial power device being configured to convert power obtained from a commercial power source connected thereto to the DC power so as to perform constant voltage control of supplying a constant voltage to the DC supply line irrespective of a current supplied therefrom to the DC supply line,
said main power device being configured to perform inclination control of monotonically decreasing its output voltage supplied therefrom to the DC supply line with an increase of its output current supplied therefrom to the DC supply line, and of monotonically increasing the output voltage with a decrease of the output current,
said controlling means being configured to, upon acknowledging that said judging means determines that the measurement exceeds the optimal current magnitude, send the instruction to said main power device such that the output current of the main power device has the same magnitude as the optimal current magnitude while the output voltage of said main power device is equal to a voltage supplied to the DC supply line from said commercial power device, and
said adjusting means being configured to, upon receiving the instruction from said controlling means, modify a condition of the inclination control so as to adjust the output current to a current corresponding to the instruction without varying the output voltage.

3. Power supply apparatus as set forth in claim 2, wherein said auxiliary power unit includes an inclination output power device,
said inclination output power device being configured to perform second inclination control of monotonically decreasing its second output voltage supplied therefrom to the DC supply line with an increase of its second output current supplied therefrom to the DC supply line, and of monotonically increasing the second output voltage with a decrease of the second output current,
said controlling means being configured to, upon acknowledging that said judging means determines that the measurement exceeds the optimal current magnitude, send a second instruction to said inclination output power device such that the second output current of said inclination output power device has the same magnitude as a difference between the measurement and the optimal current magnitude,
said inclination output power device including second adjusting means configured to adjust the second output current on the basis of the second instruction, and
said second adjusting means being configured to, upon receiving the second instruction from said controlling means, modify a condition of the second inclination control so as to adjust the second output current to a current corresponding to the second instruction without varying the second output voltage.

4. Power supply apparatus as set forth in claim 3, wherein said commercial power device is configured to, when said inclination output power device fails to supply the second output current having the magnitude corresponding to the second instruction, supply to the DC supply line the current having the same magnitude as a difference between the measurement and the sum of the output current of said main power device and the second output current of said inclination output power device.

5. Power supply apparatus as set forth in claim 1, wherein said auxiliary power unit is configured to supply to the DC supply line a current having the same magnitude as a difference between the magnitude of the current supplied from said main power device to the DC supply line and the optimal current magnitude while said adjusting means of said main power device supplies to the DC supply line the current corresponding to the instruction received from said controlling means.

* * * * *